United States Patent
Smith et al.

(10) Patent No.: US 12,248,080 B2
(45) Date of Patent: Mar. 11, 2025

(54) NETWORK LOCATIONING RF PLANNER

(71) Applicant: Telefonaktiebolaget LM Ericsson (publ), Stockholm (SE)

(72) Inventors: Roland Smith, Nepean (CA); Gunther Auer, Gothenburg (SE); Kunpeng Qi, Shanghai (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 722 days.

(21) Appl. No.: 17/276,304

(22) PCT Filed: Sep. 14, 2018

(86) PCT No.: PCT/CN2018/105780
§ 371 (c)(1),
(2) Date: Mar. 15, 2021

(87) PCT Pub. No.: WO2020/051894
PCT Pub. Date: Mar. 19, 2020

(65) Prior Publication Data
US 2021/0263128 A1   Aug. 26, 2021

(51) Int. Cl.
*G01S 5/02* (2010.01)
*G01S 5/12* (2006.01)

(52) U.S. Cl.
CPC .......... *G01S 5/021* (2013.01); *G01S 5/02216* (2020.05); *G01S 5/0244* (2020.05); *G01S 5/12* (2013.01)

(58) Field of Classification Search
CPC .... G01S 5/021; G01S 5/02216; G01S 5/0244; G01S 5/12; G01S 5/0218; G01S 5/02528; G01S 5/10; G01S 1/0423
See application file for complete search history.

(56) References Cited

U.S. PATENT DOCUMENTS 5,450,615 A * 9/1995 Fortune ............... H04B 17/373
702/159
7,835,749 B1   11/2010 Hart et al.
(Continued)

FOREIGN PATENT DOCUMENTS

| CN | 1466725 A | 1/2004 |
| CN | 101690271 A | 3/2010 |

(Continued)

OTHER PUBLICATIONS

Examination Report for Indian Patent Application No. 202147016746, mailed Apr. 1, 2022, 5 pages.
(Continued)

*Primary Examiner* — Mazda Sabouri
(74) *Attorney, Agent, or Firm* — Sonoda & Kobayashi Intellectual Property Law; Sarvajit S. Patil

(57) ABSTRACT

Systems and methods for determining an indication of locationing accuracy are disclosed herein. In some embodiments, an antenna deployment including multiple antennas and corresponding locations for the antennas is obtained. Then, one or more radio characteristics are determined for ubiety locations based on the antenna deployment and an indication of locationing accuracy for the ubiety locations is determined based on the one or more radio characteristics. In this way, an antenna deployment can be evaluated for locationing accuracy. This may be used by a network engineer or an automated system to determine and/or refine an antenna deployment.

17 Claims, 23 Drawing Sheets

(56) References Cited

U.S. PATENT DOCUMENTS

| | | | |
|---|---|---|---|
| 2010/0222081 A1 | 9/2010 | Ward et al. | |
| 2016/0131734 A1 | 5/2016 | Ray | |
| 2016/0370453 A1* | 12/2016 | Boker | G01S 5/0218 |
| 2017/0156030 A1 | 6/2017 | Peng | |
| 2017/0332248 A1 | 11/2017 | Syrjarinne et al. | |
| 2020/0077257 A1* | 3/2020 | Ekambaram | H04B 17/318 |

FOREIGN PATENT DOCUMENTS

| | | |
|---|---|---|
| CN | 107064912 A | 8/2017 |
| CN | 107843910 A | 3/2018 |
| EP | 3173809 A1 | 5/2017 |

OTHER PUBLICATIONS

Author Unknown, "Guidelines for Evaluation of Radio Transmission Technologies for IMT-2000," International Telecommunications Union (ITU), Recommendation ITU-R M.1225, 1997, 60 pages.

International Search Report and Written Opinion for International Patent Application No. PCT/CN2018/105780, mailed Apr. 28, 2019, 7 pages.

He, Jie, et al., "A practical indoor TOA ranging error model for localization algorithm," 22nd International Symposium on Personal, Indoor and Mobile Radio Communications, Sep. 2011, IEEE, pp. 1182-1186.

First Office Action for Chinese Patent Application No. 201880097486.1, mailed Apr. 18, 2023, 9 pages.

Extended European Search Report for European Patent Application No. 18933427.9, mailed Jun. 24, 2022, 9 pages.

* cited by examiner

NETWORK LOCATIONING RF PLANNER

This application is a 35 U.S.C. § 371 national phase filing of International Application No. PCT/CN2018/105780, filed Sep. 14, 2018, the disclosure of which is incorporated herein by reference in its entirety.

TECHNICAL FIELD

The present disclosure relates to determining an indication of locationing accuracy.

BACKGROUND

Planning tools are commonly used in the wireless industry to simulate Radio Frequency (RF) coverage of indoor and outdoor venues. Planning tools often employ ray tracing algorithms which operate on a venue model to assess signal power and interference levels. Planning tools often use this derived data to calculate expected modulation rates and network performance uplink and downlink throughput.

In general, planning tools have similar functions, such as providing a graphical 'heat map' view which shows RF signal strength over the desired areas of coverage, where different colors are assigned to each range of simulated signal strength. These planning tools often provide views showing calculated Signal-to-Noise Ratios (SNR) for the venue, which is used by installers for frequency reuse planning. Planning tools typically provide summary information useful to estimate Service Level Agreement (SLA) compliance, such as the percentage of the venue above a minimum defined signal power level.

While the details of the ray tracing algorithms used to calculate signal strength across the modeled venue are unique to each type of planning tool, the higher-level algorithms which add or subtract these signals to calculate signal strength and signal to interference are common.

With these planning tools, network designers are empowered with the information that they require to design, model, visualize, and publish network designs necessary to meet customer SLAs of RF coverage and expected performance.

Location-based services are expected to become a key performance requirement for wireless network designs over the new few years. As such, systems and methods for providing support for location-based services are needed.

SUMMARY

Systems and methods for determining an indication of locationing accuracy are disclosed herein. In some embodiments, an antenna deployment including multiple antennas and corresponding locations for the antennas is obtained. Then, one or more radio characteristics are determined for ubiety locations based on the antenna deployment and an indication of locationing accuracy for the ubiety locations is determined based on the one or more radio characteristics. In this way, an antenna deployment can be evaluated for locationing accuracy. This may be used by a network engineer or an automated system to determine and/or refine an antenna deployment.

In some embodiments, determining the one or more radio characteristics for the plurality of ubiety locations comprises determining a Signal-to-Noise Ratio (SNR) for the plurality of ubiety locations based on the antenna deployment. In some embodiments, determining the indication of locationing accuracy for the plurality of ubiety locations comprises determining a timing error for the plurality of ubiety locations based on the one or more radio characteristics for the plurality.

In some embodiments, determining the timing error for the plurality of ubiety locations comprises determining a Root Mean Square (RMS) timing error for the plurality of ubiety locations based on the one or more radio characteristics for the plurality of ubiety locations. In some embodiments, determining the timing error for the plurality of ubiety locations comprises determining a mean timing error for the plurality of ubiety locations based on the one or more radio characteristics for the plurality of ubiety locations.

In some embodiments, determining the indication of locationing accuracy for the plurality of ubiety locations comprises determining the indication of locationing accuracy for the plurality of ubiety locations based on the one or more radio characteristics using tables that relate the one or more radio characteristics to the indication of locationing accuracy.

In some embodiments, determining the indication of locationing accuracy for the plurality of ubiety locations comprises determining the indication of locationing accuracy for the plurality of ubiety locations based on the one or more radio characteristics using mathematical models that relate the one or more radio characteristics to the indication of locationing accuracy.

In some embodiments, determining the indication of locationing accuracy for the plurality of ubiety locations based on the one or more radio characteristics using mathematical models comprises determining the indication of locationing accuracy for the plurality of ubiety locations based on the one or more radio characteristics using the mathematical models that relate the one or more radio characteristics to the indication of locationing accuracy that accounts for multipath propagation from the plurality of antennas to the plurality of ubiety locations.

In some embodiments, determining the indication of locationing accuracy for the plurality of ubiety locations based on the one or more radio characteristics using mathematical models comprises determining the indication of locationing accuracy for the plurality of ubiety locations based on the one or more radio characteristics using the mathematical models that relate the one or more radio characteristics to the indication of locationing accuracy that accounts for how delay spread can affect Time of Flight (ToF) and/or Time Difference of Arrival (TDoA) estimate accuracy.

In some embodiments, determining the indication of locationing accuracy for the plurality of ubiety locations based on the one or more radio characteristics using the mathematical models comprises determining the indication of locationing accuracy for the plurality of ubiety locations based on the one or more radio characteristics using the mathematical models that relate the one or more radio characteristics to the indication of locationing accuracy by defining positioning accuracy as the intersection of multiple hyperbolic curves, each with varying degrees of accuracy.

In some embodiments, the method also includes generating a visual representation of the indication of locationing accuracy for the plurality of ubiety locations.

In some embodiments, generating the visual representation of the indication of locationing accuracy for the plurality of ubiety locations comprises generating a heatmap representing the indication of locationing accuracy for the plurality of ubiety locations.

In some embodiments, generating the visual representation of the indication of locationing accuracy for the plurality of ubiety locations comprises generating an isometric curve representing the indication of locationing accuracy for the plurality of ubiety locations.

In some embodiments, generating the visual representation of the indication of locationing accuracy for the plurality of ubiety locations comprises generating the visual representation indicating a number of the plurality of antennas visible at the plurality of ubiety locations.

In some embodiments, a computation node is adapted to obtain an antenna deployment comprising a plurality of antennas and corresponding locations for the plurality of antennas; determine one or more radio characteristics for a plurality of ubiety locations based on the antenna deployment; and determine an indication of locationing accuracy for the plurality of ubiety locations based on the one or more radio characteristics.

In some embodiments, a computation node includes circuitry comprising one or more processors and a memory containing instructions whereby the computation node is configured to: obtain an antenna deployment comprising a plurality of antennas and corresponding locations for the plurality of antennas; determine one or more radio characteristics for a plurality of ubiety locations based on the antenna deployment; and determine an indication of locationing accuracy for the plurality of ubiety locations based on the one or more radio characteristics.

In some embodiments, a computation node includes an obtaining module operable to obtain an antenna deployment comprising a plurality of antennas and corresponding locations for the plurality of antennas; a radio characteristics module operable to determine one or more radio characteristics for a plurality of ubiety locations based on the antenna deployment; and a locationing accuracy module operable to determine an indication of locationing accuracy for the plurality of ubiety locations based on the one or more radio characteristic.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Figure 1:
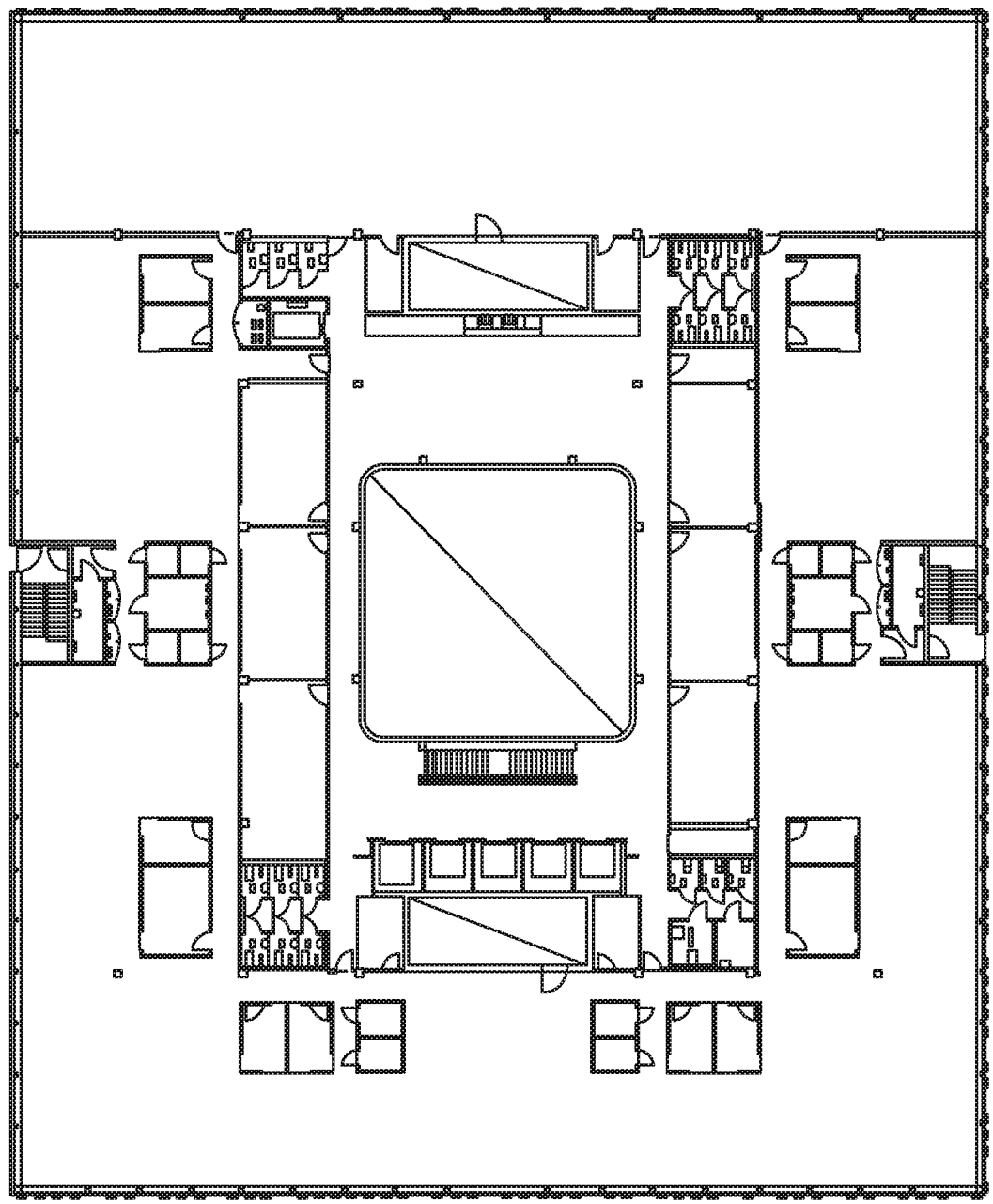
FIG. 1 is an example floorplan that can be used in planning.

As discussed in more detail below, many of the embodiments discussed herein relate to planning and implementing an indoor network deployment. However, these embodiments are not limited thereto and could be applicable in many contexts. In some embodiments, a floorplan is used such as is shown in FIG. 1. This may include outside walls, inside walls and various other structures. Additionally, the materials of these structures may be defined and/or the radio propagation characteristics may be known or derived.

Figure 2:
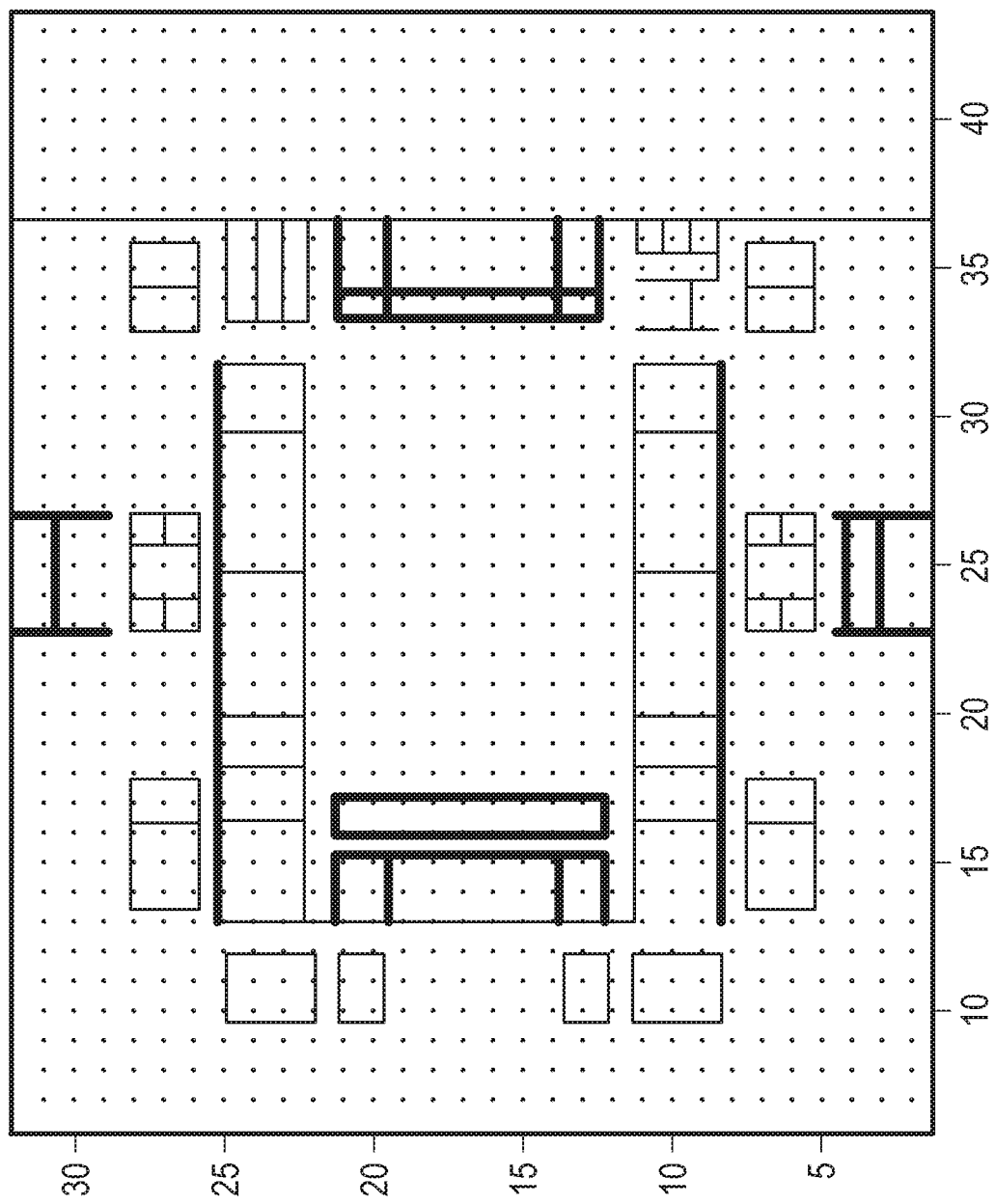
FIG. 2 illustrates another example floorplan that has been segmented into discreet locations.
Figure 3:
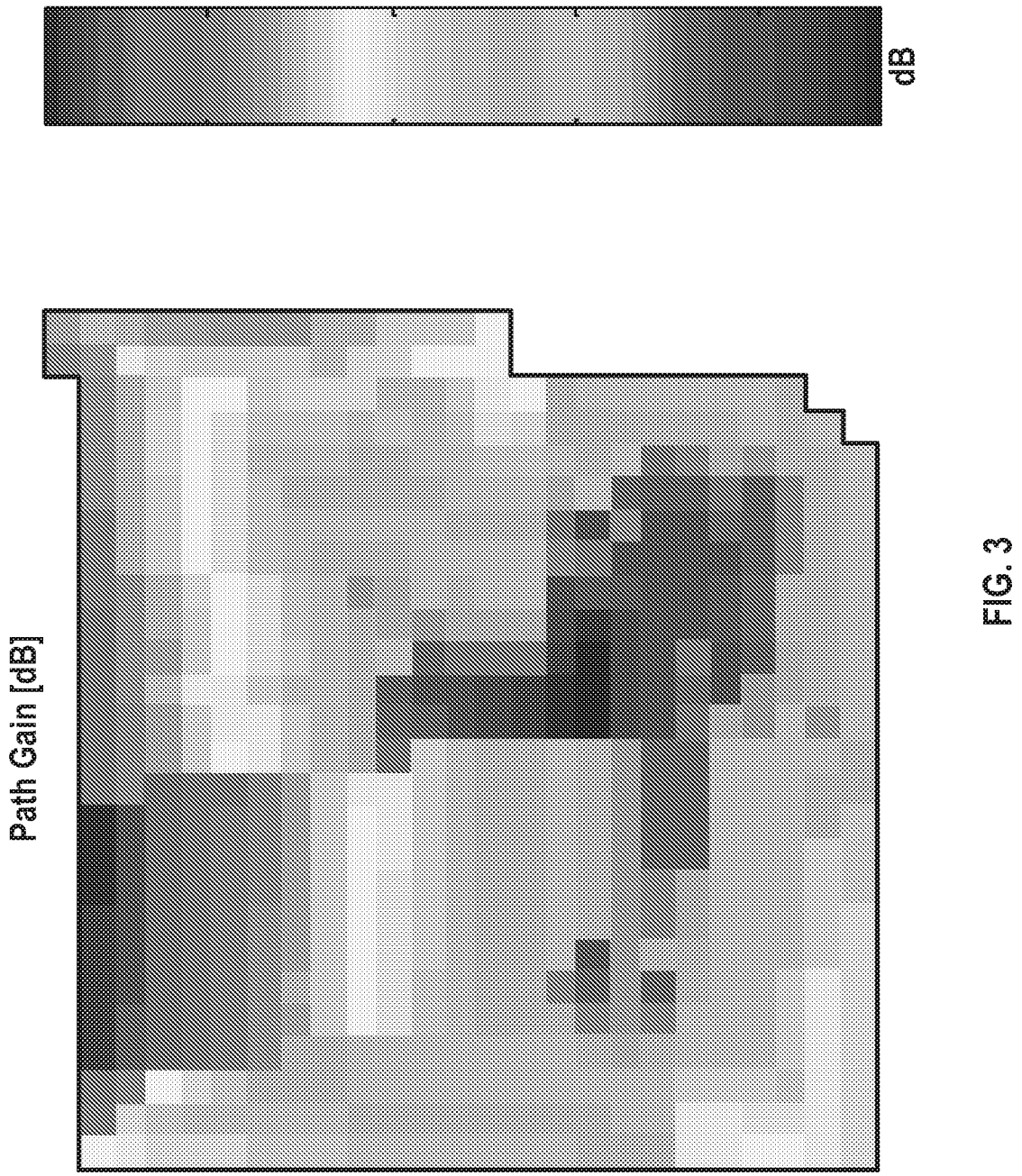
FIG. 3 shows an example where path gain is computed for all of the points in the floorplan.

FIG. 2 illustrates another example floorplan that has been segmented into discreet locations. In this example, many individual points inside the floorplan are assigned x, y coordinates. If an antenna is placed in this floorplan, various radio characteristics can be calculated for these x, y coordinates. For instance, FIG. 3 shows an example where path gain is computed for all of the points in the floorplan.

Figure 4:
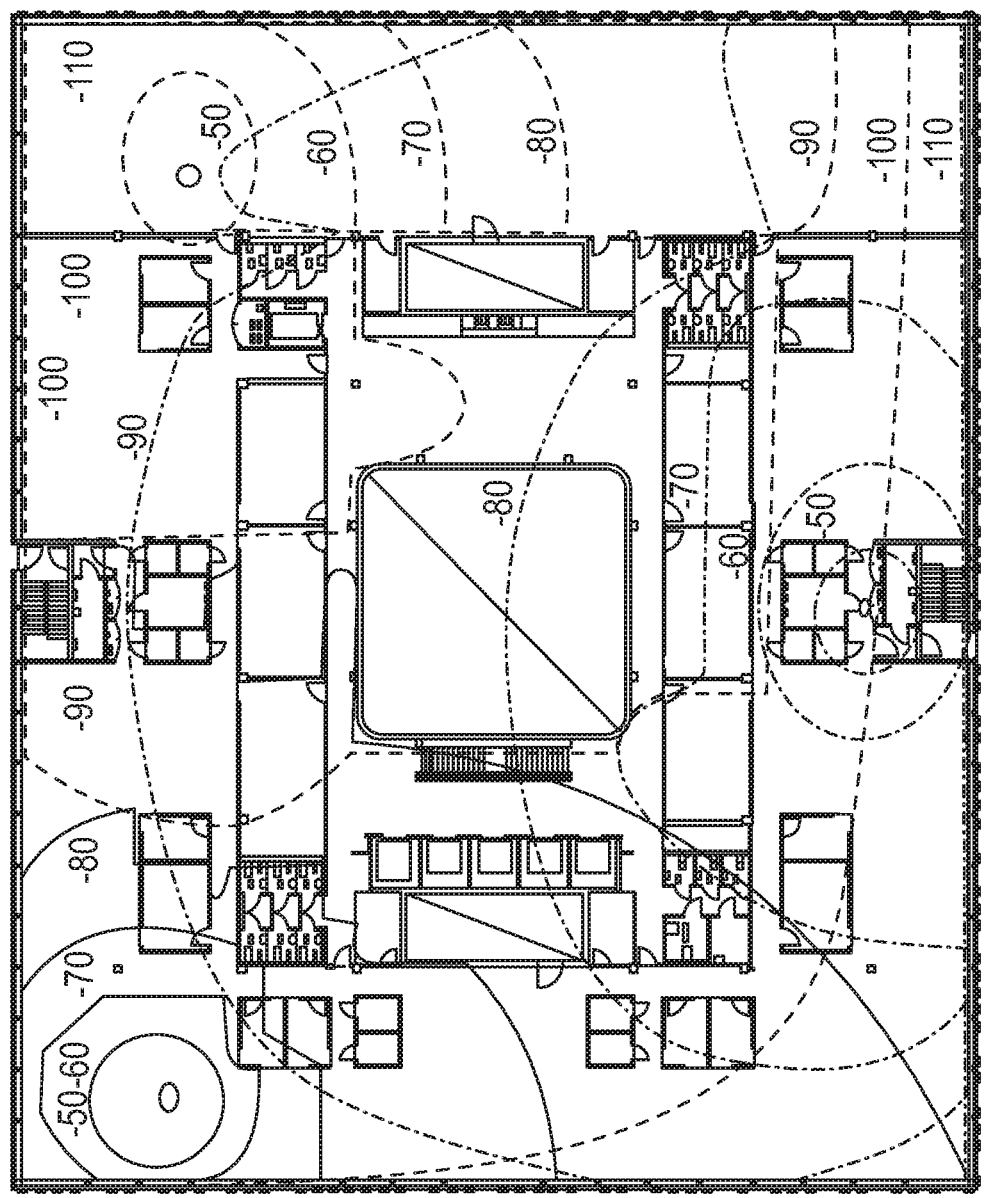
FIG. 4 shows a more detailed visualization of the example floorplan of FIG. 1.

FIG. 4 shows a more detailed visualization of the floorplan of FIG. 1. In this figure, there are three antennas at specific locations and the values of the signal are shown using different colors.

Hyperbolic positioning (also known as multi-lateration), is the process of locating an object by accurately measuring the Time Difference of Arrival (TDOA) of a signal emitted from that object to three or more receivers. It also refers to the case of locating a receiver by measuring the TDOA of a signal transmitted from three or more synchronized transmitters.

If two spatially separated emitters transmit measurable signals simultaneously, the signals will arrive at slightly different times at receiver site, and the User Equipment (UE) will be able to measure the time difference of arrival representing the different distances of each emitter from the receiver.

Figure 5:
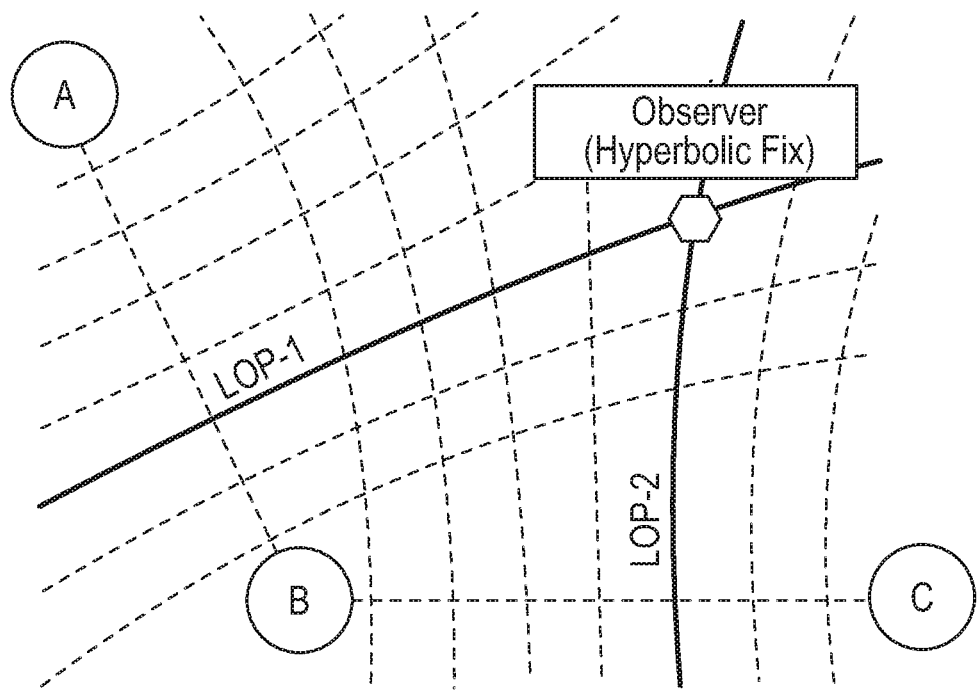
FIG. 5 illustrates two emitters at known locations (A and B) and a receiver that can be located onto a hyperboloid or hyperbola in 2-D.

In fact, for given locations of the two emitters, a whole set of receiver locations would yield the same TDOA measurement, called the Locus of all possible Positions (LOP) shown in FIG. 5, where B denotes main station and A, C are slave stations. Given two emitter locations and a known TDOA, the LOP is half of a two-sheeted hyperboloid, which in 2D case can be simplified to a hyperbola.

In FIG. 5, with two emitters at known locations (A and B), a receiver can be located onto a hyperboloid or hyperbola (LOP-1) in 2-D. Receivers do not need to know the absolute time at which the signal was transmitted—only the time difference of arrival, making UE receiver hardware or software detection implementations simple and cost-effective.

The equation for the 2-D hyperbolic position LOP-1 (x, y) between known locations A and B, where A is at location $(A_x, A_y)$, and B is at location $(B_x, B_y)$ is given by:

$$LOP\text{-}1(x,y) = \sqrt{(A_x-x)^2 + (A_y-y)^2} - \sqrt{(B_x-x)^2 + (B_y-y)^2} = R_{A,B}$$

The dashed lines between A and B show all possible LOP-1 curves for A and B for different measured time of arrival differences. The technologies standardized by the Third Generation Partnership Project (3GPP) are capable of measuring the TDOA of the signal arrival time from A and from B, as $R_{A,B}$. A fixed value of $R_{A,B}$ translates into a specific LOP-1 curve shown as the solid line between A and B.

Consider now a third emitter at a third location (C). This would provide a second TDoA measurement and hence locate the receiver on a second hyperbola in 2-D space:

$$LOP\text{-}2(x,y) = \sqrt{(C_x-x)^2 + (C_y-y)^2} - \sqrt{(B_x-x)^2 + (B_y-y)^2} = R_{C,B}$$

The set of all hyperbolas between locations C and B are shown as dashed lines, while for a fixed measured value of $R_{C,B}$ translates into a specific LOP-2 curve shown above as a solid line between C and B.

The intersection of these two solid hyperbolas describes a 2-D location point where the observer receiver lies. This is the essence of trilateration in two dimensions.

In theory, if a fourth emitter were now introduced, a third TDOA measurement would be available and the intersection of the resulting third hyperboloid with the curve already found with the other three receivers would define a unique point in space. The emitter's location would therefore be fully determined in three dimensions.

In practice, errors exist in the measurement of the time of arrival of these signals and yield an incorrect locationing result since each of the LOP curves deviates from the ideal. Enhanced accuracy can be obtained with more than four receivers, where least squared or other optimization algorithms may be used to improve the overall locationing accuracy.

In general, N emitters provide N−1 hyperboloids. When there are N>4 receivers, the N−1 hyperboloids should, assuming a perfect model and measurements, intersect on a single point. In reality however, locationing accuracy using LOP curves becomes a function of both geometry and measurement error accuracy and is explained further below. In some embodiments, this is described as a way to translate the Signal-to-Noise Ratio (SNR) of TDOA signals into time difference of arrival measurement errors. In some embodiments, this is represented as Root Mean Square (RMS) errors representing a statistical error variance.

Wireless networks today are designed mostly for coverage and/or capacity. Radio Frequency (RF) planning tools have focused their capabilities to enable network planners to see key parameters impacting coverage and/or capacity, including signal strength, and signal to interference resulting from channel reuse.

Planning a network for location-based services requires new parameters to be calculated, which are simply not supported today in existing tools.

Moreover, the parameters and methods required to assess a network design for location-based services are not considered in today's RF planning tools. Service providers are therefore unable to leverage RF propagation data to assess and plan their network for Service Level Agreement (SLA) driven location-based services.

In a future with billions of devices (e.g., Internet of Things (IoT) devices), that can be anywhere, reliable and accurate location information for these devices becomes a necessity. Both data connectivity and the ability to locate the devices are important.

Today's RF planning tools empower customers to design their networks for connectivity. However, these tools lack the capabilities to assess location accuracy.

Systems and methods for determining an indication of locationing accuracy are disclosed herein. In some embodiments, an antenna deployment including multiple antennas and corresponding locations for the antennas is obtained. Then, one or more radio characteristics are determined for ubiety locations based on the antenna deployment and an indication of locationing accuracy for the ubiety locations is determined based on the one or more radio characteristics. In this way, an antenna deployment can be evaluated for locationing accuracy. This may be used by a network engineer or an automated system to determine and/or refine an antenna deployment.

As used herein, the term "ubiety" means "the property of having a definite location at any given time; state of existing and being localized in space." In some embodiments, the term refers to defined locations, locations of importance, and/or UE location. Location Based Services (LBS) include the application of location information to enable services.

Ubiety locations, as locations of importance, may represent "Person locations" or "customer locations" such as their exact location in a venue. In this case, the ubiety locations enable services to be provided to the person or customer where they are located at that point in time. Ubiety locations may also represent "locations of interest" such as bank machines, vending machines, stores, restaurants, washrooms, etc.

Ubiety locations may represent locations of geographical importance. Within a building, ubiety locations may represent indoor coordinate systems, such as desk locations, conference room locations, office locations, etc. Ubiety locations in venues such as stadiums or halls may be seat locations, table locations, or suite locations.

Ubiety locations in retail malls may include store locations, merchandise locations, cashier locations, dressing room locations, display locations, elevator, escalator or stairs locations, entrance and exit locations, etc. Ubiety locations in hospitals may include department locations, admitting locations, office locations, services locations, etc.

Some embodiments disclosed herein propose a new paradigm for RF planning tools: the ability to assess the accuracy of ubiety locations. Ubiety locations are relative locations within a venue, derived from calculated timing accuracy and venue geometry data from multiple network RF sources. Various parameters including channel bandwidth, radio frequency signal strength, signal to noise ratio, as well as parameters within the radios, which are algorithmically combined to assess the accuracy of individual timing vectors. Some embodiments combine timing vectors with deployment geometry to assess overall locationing accuracy.

Prior art RF network planning tools do not calculate relative timing accuracy, nor do they consider the impact of antenna source geometry on ubiety location accuracy throughout the venue.

Some embodiments disclosed herein map this relative locationing accuracy into a color coded heatmap (or, in the case of color limitations such as in the drawings contained herein, a grayscale heatmap). While RF planning tools commonly use color schemes to indicate simulation results such as RF signal strengths or SNR across a venue, some embodiments herein use a color scheme to indicate estimated accuracy of ubiety locations across the venue. Different colors and gradients represent ranges of accuracies, empowering planners with an immediate visual assessment, to enable further improvements, or to demonstrate compliance to a SLA for locationing accuracy.

In some embodiments, a tool using the systems or methods disclosed herein may be used to verify positioning accuracy. This may be accomplished by calculating positioning compliance for SLAs and defining cumulative distributions for compliance as in a Positioning Accuracy Table. While some tools may calculate Reference Signal Received Power (RSRP) Decibel-Milliwatts (dBms), Reference Signal Received Quality (RSRQ) Decibels (dB), and throughput, none of them consider locationing or parameters associated with positioning.

| Positioning Accuracy* [m] | |
|---|---|
| <2 m | 12% |
| <3 m | 28% |
| <4 m | 39% |
| <5 m | 85% |
| <8 m | 90% |
| <10 m | 95% |

*2σ measurement accuracy.

Service Providers commonly employ SLAs to ensure that their suppliers meet a performance standard threshold for aspects of the delivered network solution. Suppliers are required to demonstrate SLA compliance to Key Performance Indicators (KPIs), such as Signal strength which may be an Rx Level for a Global System for Mobile Communications (GSM), Received Signal Code Power (RSCP) for a Universal Mobile Telecommunications System (UMTS), and RSRP (dBm) for Long Term Evolution (LTE). Other KPIs include signal strength/quality such as RxQual for GSM, Received Chip Energy over Noise or (Ec/No) for UMTS, and RSRQ (dB) for LTE.

While Service Providers may initially conduct performance acceptance tests to confirm these KPIs, they often rely on RF Planning tools to simulate and summarize these parameters in specified areas across the venue. A Service Provider may contractually demand a minimum RSRP and RSRQ in all accessible areas of a stadium such as the seating and concourse areas, and RF Planning tools today are able to provide summaries of this data to be presented to the Service Provider as proof of meeting the SLA. Of course, the planning tool is designed to accurately calculate these SLA parameters, and Service Providers only accept the simulated evidence after verifying the accuracy of the results through spot checks.

In embodiments disclosed herein, the Service provider may specify UE location accuracy to be <±3 m 68% of the time=1σ or 1 standard deviation, <±5 m 95% of the time (2σ), and <±10 m 98% of the time 2.4σ). Such calculations involve knowledge of the algorithms and assessing the parameters which affect UE location estimation.

The Network Locationing RF Planner may therefore provide a section for either the type of locationing application, and/or the specific type of locationing to be performed. Precise locationing is not currently defined by standards and suppliers may have unique algorithms for determining locationing. Therefore, the planner may have a field to select the type or supplier of locationing software.

In some embodiments, locationing accuracy is impacted by channel bandwidth. In general NB-IoT and Cat M1 devices have poorer accuracies while mobile phone UEs attach to wider bandwidth channels yielding increased accuracies. LTE Cat M1 is a low power air interface that enables connection of IoT and Machine-to-Machine (M2M) devices with lower data rate requirements. LTE Cat M1 enables longer battery lifecycles and greater in-building signals, as compared to other cellular technologies. The application may therefore have fields which set the type of device and/or the channel bandwidth.

In some embodiments, the systems and methods calculate Root Mean Square Error (RMSE) using conversion tables, data structures, or internal criteria. The definition and selection of RMSE conversion tables may be derived empirically, though simulations, or through standards defined tables. The tool does not assume that measurements are perfect; rather it relies on conversion tables etc. The tool may have a database of different algorithms, for example, the tool may specify a Cisco Hyperlocation algorithm, or an Ericsson Radio DOT System Fifth Generation (5G)/New Radio (NR) algorithm, etc.

In some embodiments, obtaining an antenna deployment including a number of antennas and corresponding locations for the antennas is accomplished by accepting as input a model of the venue consisting of imported floor plans which are one of various formats such as, but not limited to *.dwg, *.dxf, *.jpeg, *.bmp, *.tiff, *.gif, *.ibw, or *.pdf. In general, the RF planning tool has capabilities to modify the electromagnetic properties of walls and surfaces, such as types of materials—concrete, steel, drywall, glass, etc., the thicknesses of the walls/surfaces, the lengths, heights, and inclines of the walls/surfaces. The RF planning tool will also have a database of components specific to locationing. For example, the tool may specify cable types and delays, or it may specify Ericsson Radio DOT system transceivers, or micro/macro radio transceiver units.

Since in some embodiments, positioning is calculated using RF signal timing measurements, the results may be impacted by delays in cable lengths. Therefore, in some embodiments disclosed herein, parameters are defined which describe the cable time delay and variability, such as the Propagation Delay (PD). Input parameters used by the RF Planning tool may take on various forms. In the most basic form, it may be a direct measurement of delay and delay variation; for example, the delay may be measured as 500 ns/100 m, and the variation over temperature, cable type, and aging may be 2%. Alternately, this input to the RF planning tool may be a direct measurement made by installers, where tools have been used to measure cable delays, and have entered numbers into the RF planning tool. However, other methods may be used to measure cable delays, or to capture the measurement accuracy affected by the cables.

The RF planning tool may allow the user to specify the propagation delay as a Nominal Velocity of Propagation (NVP), for example, the cable may be polyethylene and have a NVP in the range of 0.65 c to 0.70 c, where 'c' represents the speed of light approximately given as $3 \times 10^8$ m/s. The RF planning tool may then have attributes for each cable length. There may also be a variability defined for the NVP over frequency, as this property is affected by the signal frequency transmitted. The RF planning tool may allow the user to specify the length and type of cable, for example, it may provide the user with a selection of cable types by manufacturer and from this data, derive the velocity of the cable. The RF planning tool may allow the user to specify the general parameters of the cable, for example, it may specify that the RF cable is Foam Polyethylene with a capacitance of 24.5 pF/foot, a dielectric constant of 1.45 and a NVP of 83.0%. This data may be combined with length to calculate the delay. The RF planning tool may allow the user to specify the actual measured cable delays, and may include an indication of the cable delay variation.

The RF planning tool may also allow the installer to specify the location of the radio transceiver in the venue model, and may include the ability to specify the relative accuracy of this location. For example, RF planning tools today allow the user to locate the RF transceiver within the venue, however, they do not today include an indication of the relative accuracy of that placement. Indoor venues might not have an absolute positioning reference plane such as Global Positioning System (GPS), and this makes it very difficult for installers to precisely locate where a radio is installed. The RF tool may indicate that the radio is located attached to the ceiling along a corridor exactly 6 m from one of the walls, but the actual installation may vary by 1 m due to installation errors, or lack of available support frames from which to affix the radio to the ceiling. These errors in precision affect the locationing accuracy of the RF planning tool.

The RF Planning tool may export data to be used by a Locationing Software application. As discussed above, the Locationing Software application may require details such as the geodetic (x, y, z) locations of the radio transceivers, and may include the cable delays for each of those transceivers. In some embodiments disclosed herein, this data of radio transceiver locations and/or cable delays may be exported for input to a locationing tool.

In some embodiments, the systems and methods disclosed herein may also have an optimization aspect where it positions the transceivers to minimize positioning errors. For auto node deployment, the obtained location accuracy estimation is utilized to improve the node deployment. In some embodiments, this could be accomplished by determining a set of candidate node deployments, calculating the location accuracy of each candidate deployment, and choosing the deployment candidate with the best accuracy. In some embodiments, this might also include deriving a new candidate node deployment based on the location accuracy information. This could be based on a known optimization algorithm, e.g., gradient search. This process could be continued until the location accuracy is sufficiently accurate, or the improvement from the previous step becomes negligible.

For example, the assessment planner may use color codes to represent location accuracies of: <1 meter (m), 1-2 m, 2-3 m, 3-4 m, 4-5 m, 5-10 m, >10 m, etc.

Embodiments disclosed herein provide multiple systems and methods to calculate location accuracy. These translate parameters of bandwidth, RF signal strength, and SNR into estimated Time of Arrival (ToA) or Time of Flight (ToF) relative timing measurement accuracies, used to calculate location accuracy. The accuracies of timing related parameters have empirically or theoretically derived relationships to RF signal strength, SNR, bandwidth, and other network parameters. These relationships are included as modelled data into the Ubiety Assessment Planner.

Some embodiments introduce new calculated parameters which are not considered in today's RF planning tools. Systems and methods described herein use calculated RF multipath ray tracing distance data to derive uplink and/or downlink delay spreads, which can adversely affect overall positioning accuracy. Moreover, by considering delay spreads in the presented positioning calculations, this further empowers installers to plan the RF design of the venue to consider, and minimize the delay spread. In addition to a heat map which presents locationing accuracy, systems and methods may define a heat map showing multipath delay spread across the venue.

As discussed above, locationing trilateration requires timing vector data from multiple RF sources. Some embodiments herein use heatmaps to show the number of visible RF sources from ubiety locations throughout the venue. This empowers network designers to immediately assess if poor location accuracies are caused by insufficient visible RF sources.

Geometry is another aspect affecting locationing accuracy. Locationing often uses differential time of arrival measurements and solving for position yields hyperbolic curves each with error bounds, which are solved to assess the location accuracy. Some embodiments use heatmaps to show the relative geometrical accuracy of the positioning, to enable network designers to readily identify venue coverage areas affected by poor geometries.

The embodiments disclosed herein have many advantages. Some embodiments may have some combination of the following advantages:

Some embodiments empower installers with the means to design a network to achieve a known level of locationing accuracy. This is increasingly important as today's RF Planning Tools only consider basic RF parameters of signal strength and coverage in their designs.

Some embodiments enable installers/network designers to select the method by which they plan to use for positioning, such as uplink or downlink differential time of arrival, or time-of-flight calculations, and it accepts the empirical and/or theoretical model data to perform the locationing assessment.

Some embodiments provide a visual indication through a color scheme heatmap or through isometric curves the end customer can view to assess location accuracy of the designed network.

Some embodiments provide summary data for the venue, or defined portion(s) of the venue, to empower the installer to assess overall service level, such as an SLA where 99% of the venue shall achieve locationing accuracy to 3 m, and 95% of the venue shall achieve locationing accuracy to 1 m.

Some embodiments provide an indication of the number of visible and contributing RF transceivers through a venue, or for defined portions of the venue, using a color scheme heatmap, isometric curves, or ubiety point summarized data, enabling installers and/or network planners to readily assess regions of the venue which have insufficient visibility to multiple radio transceivers/RF sources.

Some embodiments provide an indication of delay spread throughout the venue, or for defined portions of the venue, through a color scheme heatmap, isometric curve, or ubiety point summarized data, enabling installers and/or network planners to readily assess if network design changes are needed to minimize delay spread issues.

Some embodiments provide an indication of geometry issues throughout the venue or for defined portions of the venue through a color scheme heatmap, isometric curve, or ubiety point summarized data, enabling installers and/or network planners to readily assess areas where geometry problems exist and if network design changes are needed to minimize locationing errors.

Some embodiments provide an indication of the areas of the network which are not covered by the desired RF transmitters to a sufficient dominance factor to ensure that users are connected to this network, rather than other networks. Some embodiments mark areas where dominance factor is insufficient to guarantee that the UE or IoT devices can be located with the installed network. In some embodiments, areas are marked where a certain number of nodes can be seen with sufficient quality (e.g., SNR). Since in some embodiments four signal sources are needed for an unambiguous location estimate, this would serve as an indication for the expected location accuracy of a deployment.

Areas not meeting the required dominance factor may be marked as hashed, or greyed out areas, or may be simply indicated as not part of the coverage area.

Some embodiments of this disclosure introduce a model to assess locationing accuracy. The model translates some combination of the following: radio transceiver network configuration, simulated RF parameters, simulated distances, and simulated channel multipath/delay spread, to assess the expected accuracies of timing vectors.

While these timing vectors are described as differential timing measurements, such as TDOA, this method is equally applicable to absolute measurements, such as ToF. Each measurement has a measured power and SNR, which is used herein to translate into a statistical measure of timing measurement accuracy.

More specifically, a data relationship model for timing measurement accuracy is defined. One example of this model appears in FIGS. 6A, 6B, and 6C with logarithmic and linear axes to demonstrate an example non-linear relationship between SNR and timing accuracy variance or RMS error.

Figure 6A:
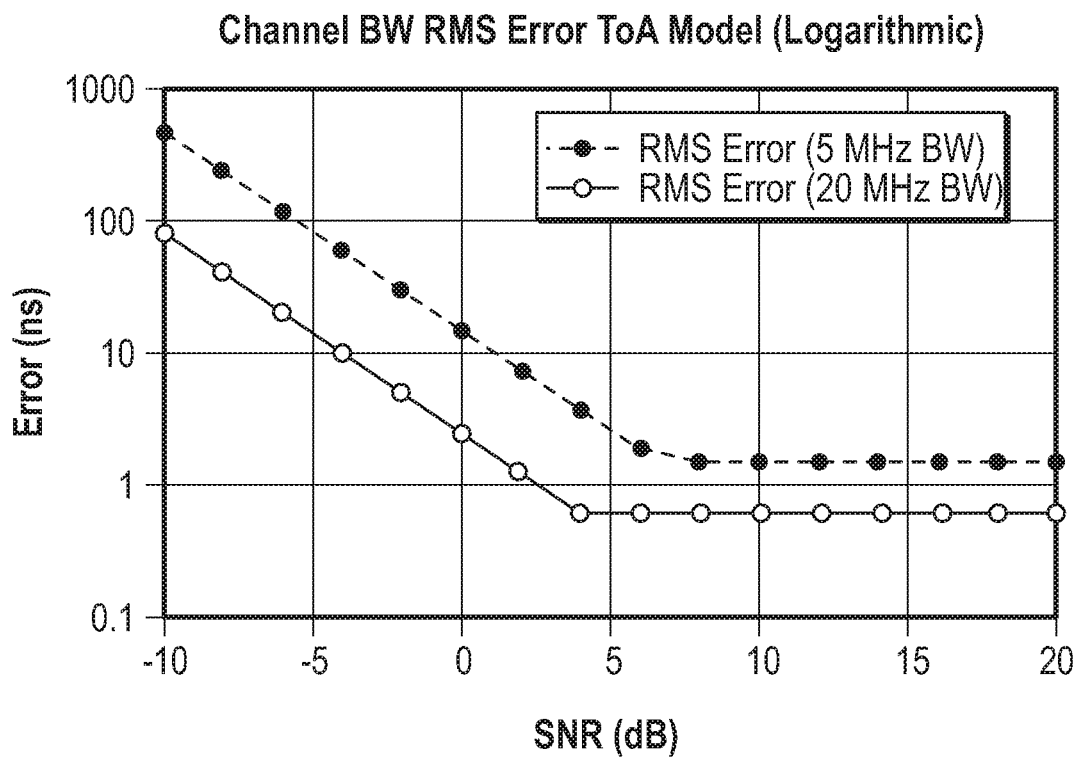
FIGS. 6A, 6B, and 6C illustrate with logarithmic and linear axes an example non-linear relationship between Signal-to-Noise Ratio (SNR) and timing accuracy variance or Root Mean Square (RMS) error, according to some embodiments of the current disclosure.
Figure 6B:
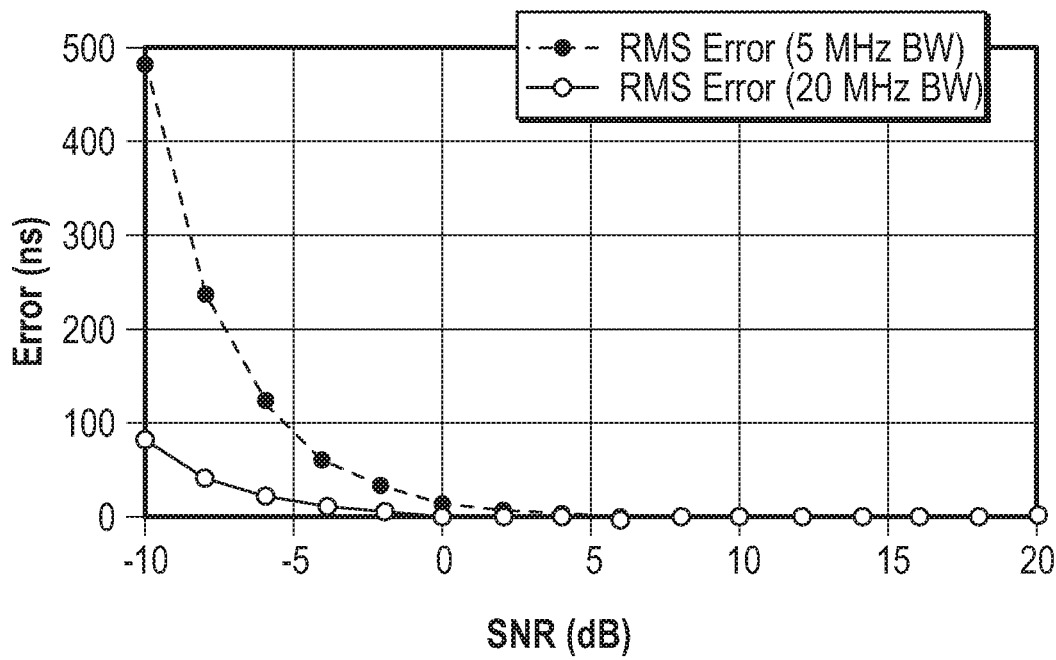
Figure 6C:
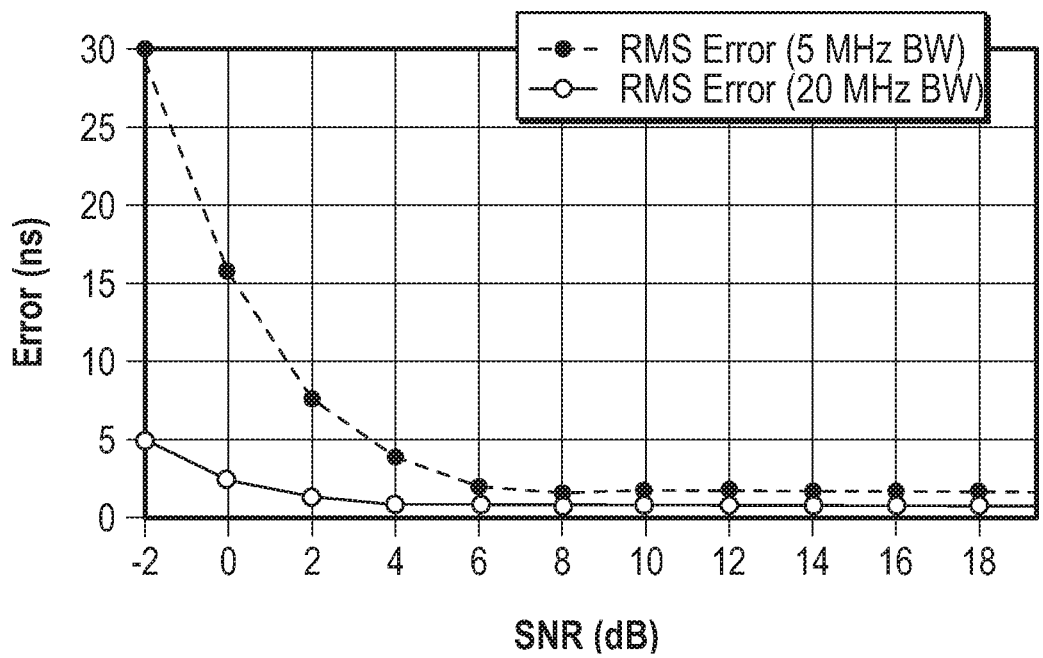

FIGS. 6A, 6B, and 6C illustrate models used by the RF Planning software to convert calculated SNR values into error estimates of the calculated time-of-flight or time-of-arrival time measurements. FIG. 6A illustrates a relationship between SNR and timing error in a logarithmic graph. FIG. 6B illustrates a relationship between SNR and timing error in a linear graph. FIG. 6C is a zoomed in version of FIG. 6B.

For example, if the distance between a ubiety location and a nearby RF transceiver is 40 m, then the RF Planning software would naturally calculate a time-of-flight of 40 m*3.3 ns/m=132 ns.

However, if the RF Planning software calculated the SNR to be 0 dB with a 5 MHz RF channel, this model shows a timing RMS error of ±15 ns, so that the ToF or ToA value becomes 132 ns with a variance of 15 ns, yielding a positioning vector of 40±4.5 m.

These calculations depend on characterization data provided by radio equipment manufacturers who tabulate the performance of their solution in being able to accurately estimate timing vectors. The RF Planning tool requires this data, either as a model, or as a table, to be able to be able to assess the accuracy of the timing measurements The propagation delay is a representation of the elapsed time between emitting and receiving an electromagnetic wave from a transmission (Tx) to reception (Rx) point, respectively. Accurate TDoA estimations require a direct propagation path between transmitter and receiver. However, in Non-Line of Sight (NLoS) conditions, the actual propagation paths may not coincide with the direct path between Tx and Rx. Rather the propagation paths may be reflected and/or diffracted, which results in a longer propagation path than the distance between Tx and Rx. This in turn induces a bias in the ToA and ToF estimation. While there are ways to mitigate inaccuracies associated with NLoS propagation, they are all limited by LoS signal strength and ability to extract the LoS signal. The LoS signal often has much lower signal strength as it passes through walls or other obstacles, and this results in reduced positioning accuracy. The RF planning tool may detect these issues empowering installers to optimize the network by knowledge of the simulated performance.

An RF planning tool typically employs a channel propagation engine, which involves calculating (possibly multiple) propagation paths between Tx and Rx. This information may be extracted and further processed to estimate the effective length of the propagation paths and in turn propagation delay. The anticipated bias in the TDoA and ToF estimation for any Tx and Rx pair may be visualized as a location dependent TDoA estimation bias in a heatmap.

In a further embodiment, the locationing algorithm may be improved by providing the bias derived from the RF planning tool to the locationing software. In one embodiment the propagation delay bias could be provided in the form of a distance dependent variable, $b_{Tx}(d)$, where the distance d denotes the direct straight-line distance between a Tx and Rx pair. The RF planning tool may then provide $b_{Tx}(d)$ as the average bias of all Rx locations around a given transmitter Tx. In other words, the bias $b_{Tx}(d)$ describes the averaged bias of receivers located on concentric circles around Tx with radius d.

In a further embodiment, the RF planning tool simulated RF data may be exported for use by a locationing application. The RF Planning tool simulated data describing the relative signal strength throughout the venue of each of the simulated radio transmitters may be made available to the locationing software to be used as an RF fingerprint, to improve locationing accuracy.

In a further embodiment, the RF planning tool simulated ToA data may be exported for use by a locationing application. The RF Planning tool simulated data describing the relative time of arrival throughout the venue of each of the simulated radio transmitters may be made available to the locationing software to be used as an RF ToA fingerprint, to improve locationing accuracy. This data may provide the multipath data for the venue, empowering the locationing software with a "timing fingerprint" to improve measurement ability, especially for non-LoS areas of the venue. This exportable data may be a comprehensive fingerprint including the RF power from the various radio transmitters, as well as multipath delays from the various radio transmitters. This exportable data may be less comprehensive, with only the calculated centroid of the delay spread.

In a further embodiment, the RF planning tool simulated data may include the actual simulated locationing software algorithm measurements to be used by the supplier. In this embodiment, the RF planning tool simulations have been optimized to match for example, with an Ericsson positioning algorithm, and the exported data would be used by the Ericsson locationing software to refine Ubiety locations.

In a further embodiment the locationing accuracy could be further improved by taking into account Angle of Departure (AoD) and Angle of Arrival (AoA) on Tx and Rx, respectively. This may be the case for radio systems employing multiple transmit and receive antennas, known as Multiple Input Multiple Output (MIMO). In this case the bias of the propagation delay provided by the RF planning tool, $b_{T_x}$ (d, α, β, could include the AoA a and/or the AoD β. In this case, less averaging would improve the locationing accuracy.

In the previous discussion, it was assumed that there is one propagation path between transmitter and receiver. Typically, there will be several propagation paths between any transmitter and receiver pair Tx and Rx, denoted as multipath.

Delay spread is a representation of the multipath echoes in the channel, and each environment/venue has different characteristics. The International Telecommunication Union (ITU) defines different reference models for delay spread, as examples of the amount of delay which is expected to be seen. ITU REC-M.1225 defines indoor and outdoor models, with RMS delay spreads ranging from 35 ns to 100 ns (indoor office), 45 ns to 750 ns (outdoor to indoor), and even 370 ns-4000 ns (outdoor vehicular). Many of the embodiments of this disclosure focus on indoor venues, but the methods are not limited thereto. Indoor venues often have much lower but still considerable delay spreads up to 100 ns RMS.

Figure 7:
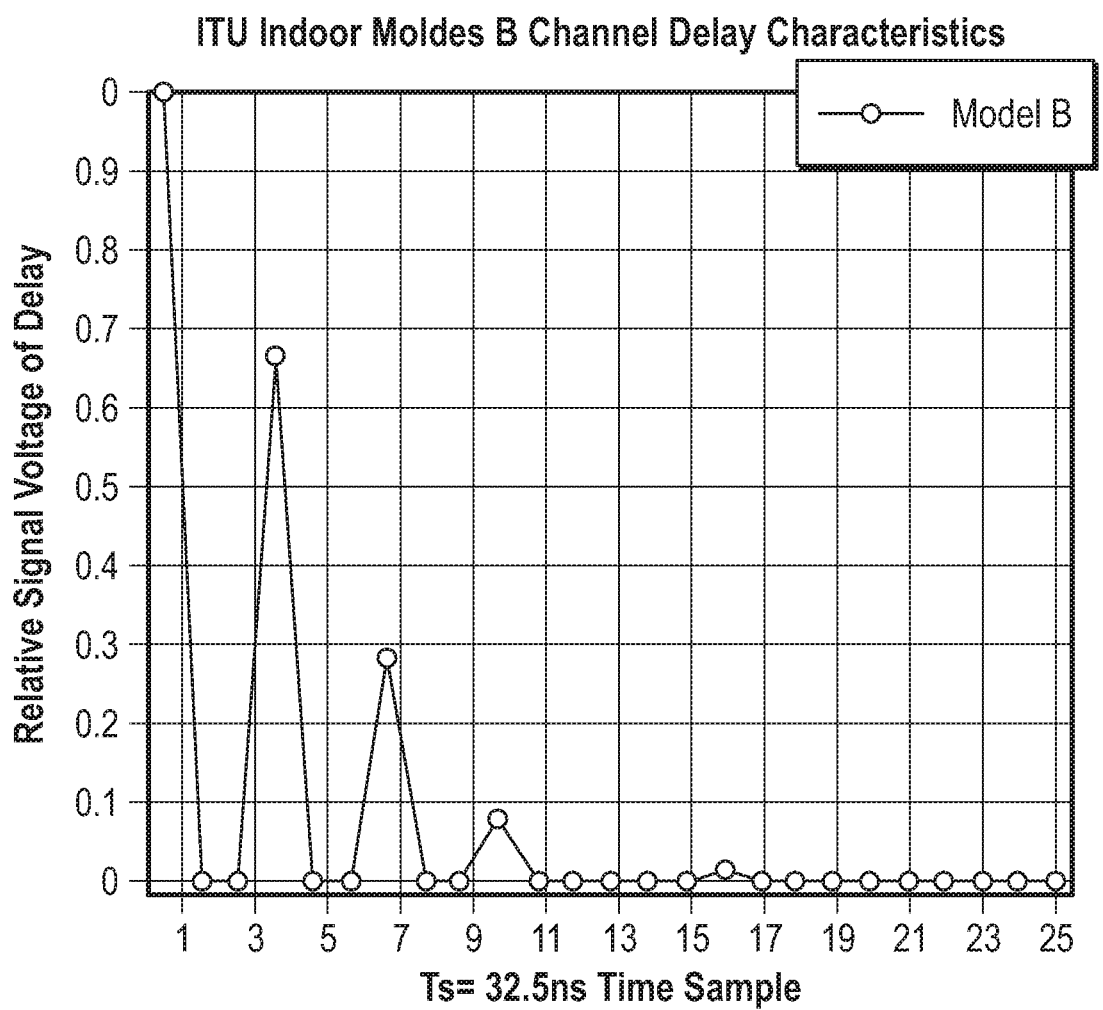
FIG. 7 illustrates a typical high dispersion environment according to some embodiments of the present disclosure.

FIG. 7 illustrates a typical high dispersion environment with 100 ns of RMS delay according to an example model of the delay taps made by the International Telecommunication Union (ITU).

Delay spread is unique to each environment with different multipath echoes and RMS delay, yet delay spread can affect the calculated mean value of the time-of-flight or time-of-arrival signal and may be accounted for when modelling the ToF or ToA measurements.

Figure 8:
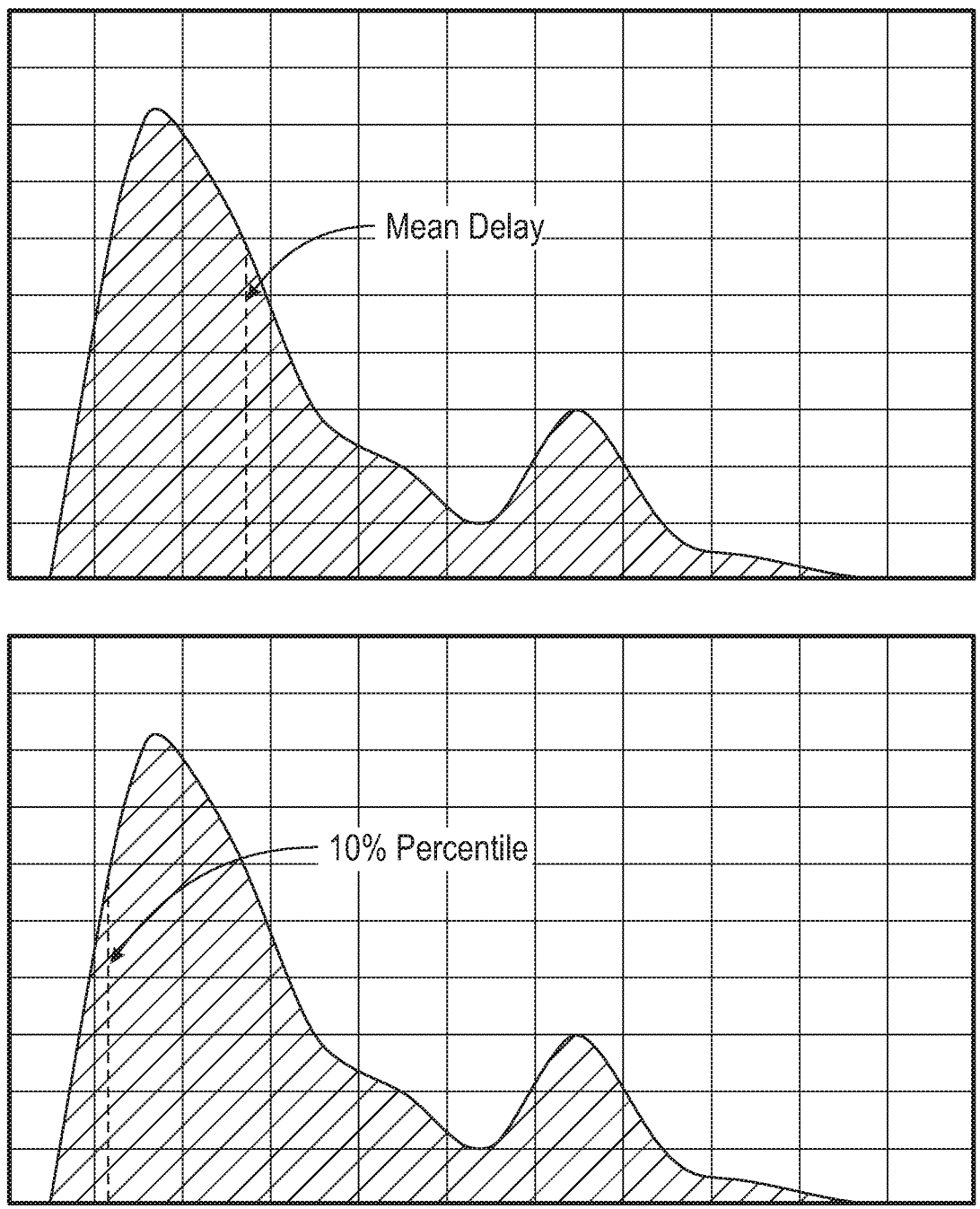
FIG. 8 illustrates an example of finding the mean delay and finding the tenth percentile delay according to some embodiments of the present disclosure.

In the context of the propagation delay model described in the previous section, the propagation delay may refer to either the shortest or the strongest propagation path. For example, a WiFi or Long Term Evolution (LTE) chipset may calculate the ToA based on the RMS delay spread, which is to say that the signal timing is based on the centroid or center of mass of the multipath echo. Other equipment may base the ToF or ToA calculations on a percentile of received power, for example, the centroid of the fastest 10% of the received signal power. All receivers require at least a portion of the received multipath energy to accurately assess the ToF or ToA. FIG. 8 illustrates an example of finding the mean delay and finding the tenth percentile delay.

RF planning tools may be able to predict one or several propagation paths between a given Tx and Rx pair. In the latter case, the RF planning tool is able to calculate the propagation delays of the respective paths, which can be used to provide an estimate of the RMS delay spread at a given location. Other specific building properties, such as line of sight/not-line of sight, number of crossed walls, open/closed building layout, wall materials (glass, dry wall, concrete, etc.), and distance between Rx and Tx could be used to further enhance the estimate of the RMS delay spread. Typical values for a certain building type could be read from a look up table or database, where the database could be populated by data gathered with the locationing software in existing deployments.

In line with the propagation delay model, the location specific RMS spread derived by the RF planning tool may be provided to the locationing software in order to compensate the systematic error induced by the multipath propagation.

A delay spread model enables the RF Planning ubiety assessment tool to map mean errors in the ToF or ToA measurements to the simulated multipath signal.

For example, the ToF/ToA receiver may employ a simple centroid-based estimation algorithm, where the mean power delay of the various multipath components is used to estimate the ToF/ToA signals. In this case, the Ubiety Assessment planner may use a simple linear centroid model to define the timing errors in the calculated ToF or ToA value.

The table may appear as below (Table 1), and would be a possible indication of infringement. In this case, the RF planning tool is employing information, either in the form of a table, or in the form of a selection of a trilateration algorithm (where the data below is implicit in the selected model):

TABLE 1

| Centroid (50% Mean Delay) | | Centroid (10% Mean Delay) | |
| --- | --- | --- | --- |
| RMS Delay (ns) | Mean Error (ns) | RMS Delay (ns) | Mean Error (ns) |
| 0 | 0 | 0 | 0 |
| 10 | −10 | 10 | −1 |
| 20 | −20 | 20 | −2 |
| 30 | −30 | 30 | −3 |
| 40 | −40 | 40 | −4 |
| 50 | −50 | 50 | −5 |
| 60 | −60 | 60 | −6 |
| 70 | −70 | 70 | −7 |
| 80 | −80 | 80 | −8 |
| 90 | −90 | 90 | −9 |
| 100 | −100 | 100 | −10 |
| 110 | −110 | 110 | −11 |
| 120 | −120 | 120 | −12 |
| 130 | −130 | 130 | −13 |
| 140 | −140 | 140 | −14 |
| 150 | −150 | 150 | −15 |
| 160 | −160 | 160 | −16 |
| 170 | −170 | 170 | −17 |
| 180 | −180 | 180 | −18 |
| 190 | −190 | 190 | −19 |
| 200 | −200 | 200 | −20 |

Since the actual positioning application used in the network is unlikely to be aware of these multipath errors, they are considered as timing errors in the determining location accuracy.

Installers/network designers who use the RF Planning Assessment tool to determine location accuracy would know the type of algorithm to be performed and would enter the delay spread model data into the planning tool, or simply select the type of algorithm to be used in assessing the location accuracy.

The planning tool can then visually present either the simulated multipath delay spread or alternately, may apply a modelled error based on how the delay spread may be known to affect the measurements.

It is worth noting that locationing relies on at least three, and typically four or more timing vectors. Each of these vectors will experience different multipath delay spreads, and therefore, each will contribute to the total error of the locationing software. It is expected that the RF Planning tool will be able to calculate all multipath delay spread error vectors independently, as well as together to assess the total locationing error which can be attributed to delay spread.

Installers and/or network designers may use this information provided by the RF Planning Ubiety Assessment tool to reduce non-line of sight cases, and thereby reduce the overall impact of delay spread. A visual interface will help the installer or network designer with this optimization process.

Figure 9:
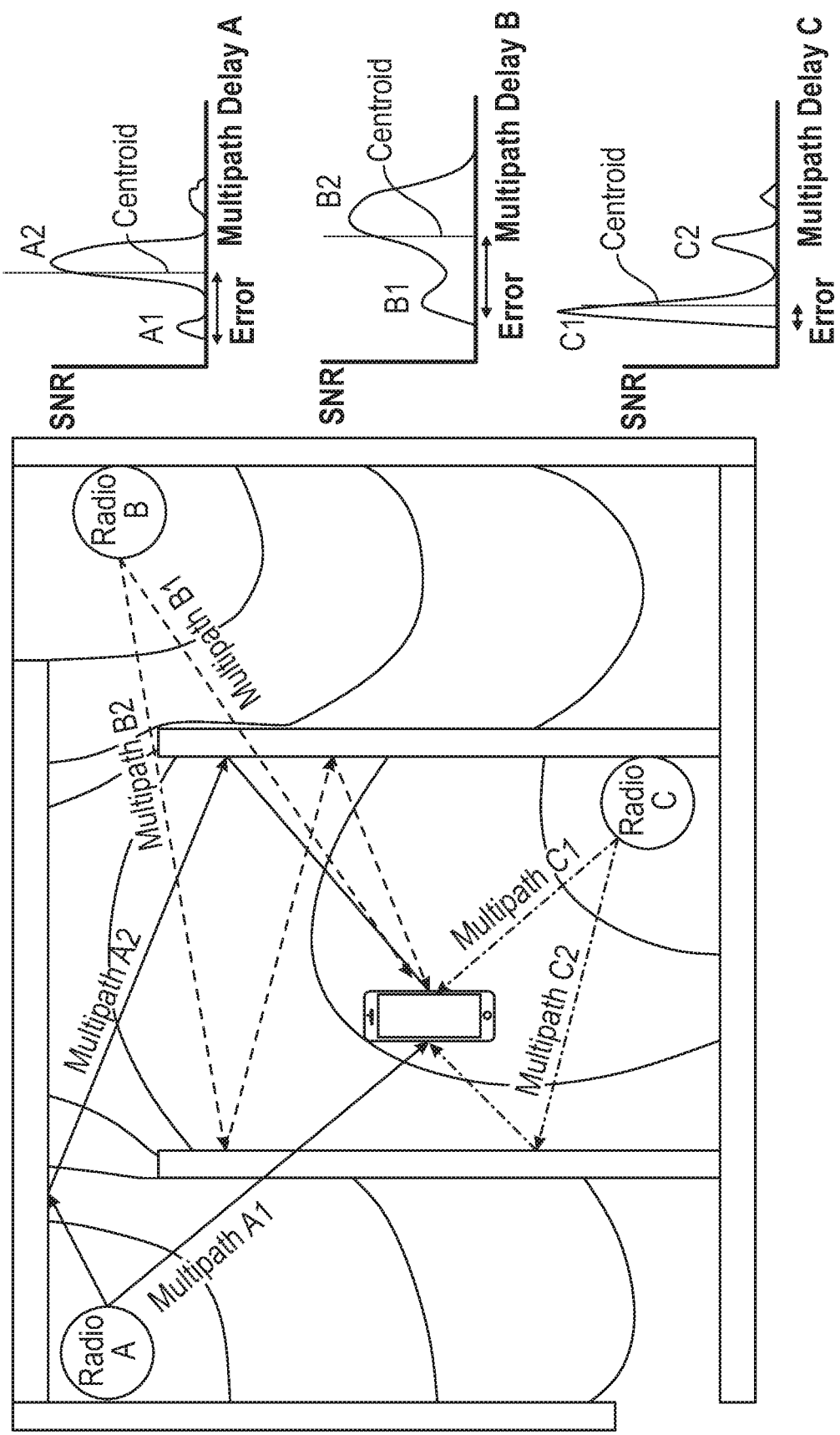
FIG. 9 illustrates poor location accuracy due to high multipath delay causing large errors between the centroid and line of sight path delays according to some embodiments of the present disclosure.

For example, in the example shown in FIG. 9, the RF planning tool may assess poor location accuracy due to high multipath delay causing large errors between the centroid and line of sight LoS path delays.

Figure 10:
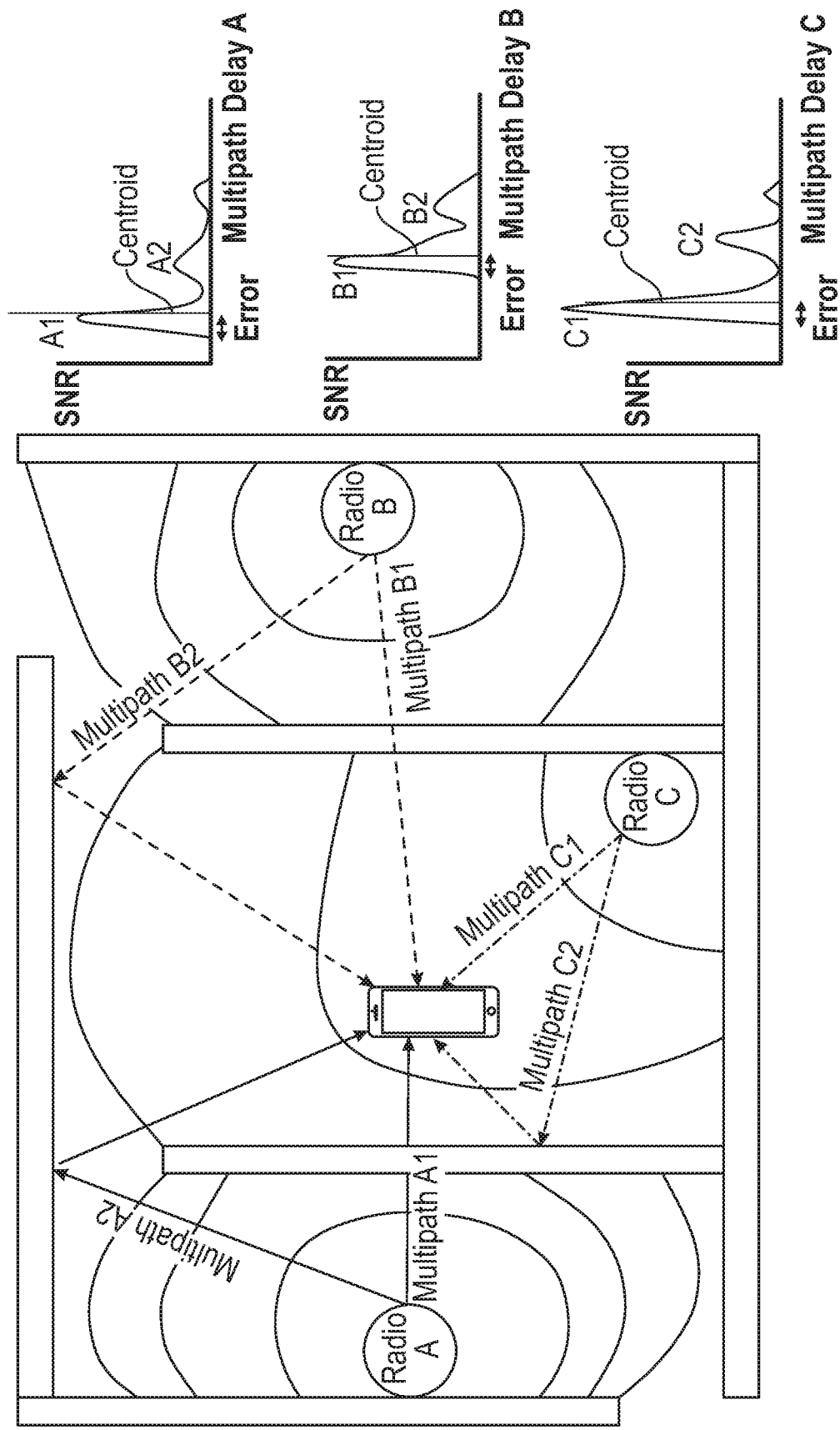
FIG. 10 illustrates a modified version of FIG. 9 where the locations of radios A and B have been moved such that the excessive errors between line of sight Radio Frequency (RF) SNR and non-Line of Sight (LoS) SNR are greatly reduced according to some embodiments of the present disclosure.

In the example shown in FIG. 10, the network engineer has used the RF planning tool errors and has moved the locations of radios A and B. The excessive errors between line of sight RF SNR and NLoS SNR are greatly reduced, thereby minimizing the errors cause by multipath delays.

Some embodiments of this disclosure present an assessment of the multipath errors of the signals to enable network engineers to visualize and minimize these errors through optimal placements of radio transceivers, or for automated decision making.

Geometry plays a major role in the accuracy of locationing. As discussed, each ubiety location within the venue requires signals from three (for 2D positioning) and typically four (for 3D positioning) or more RF transceivers to be able to perform accurate trilateration calculations.

Figure 11:
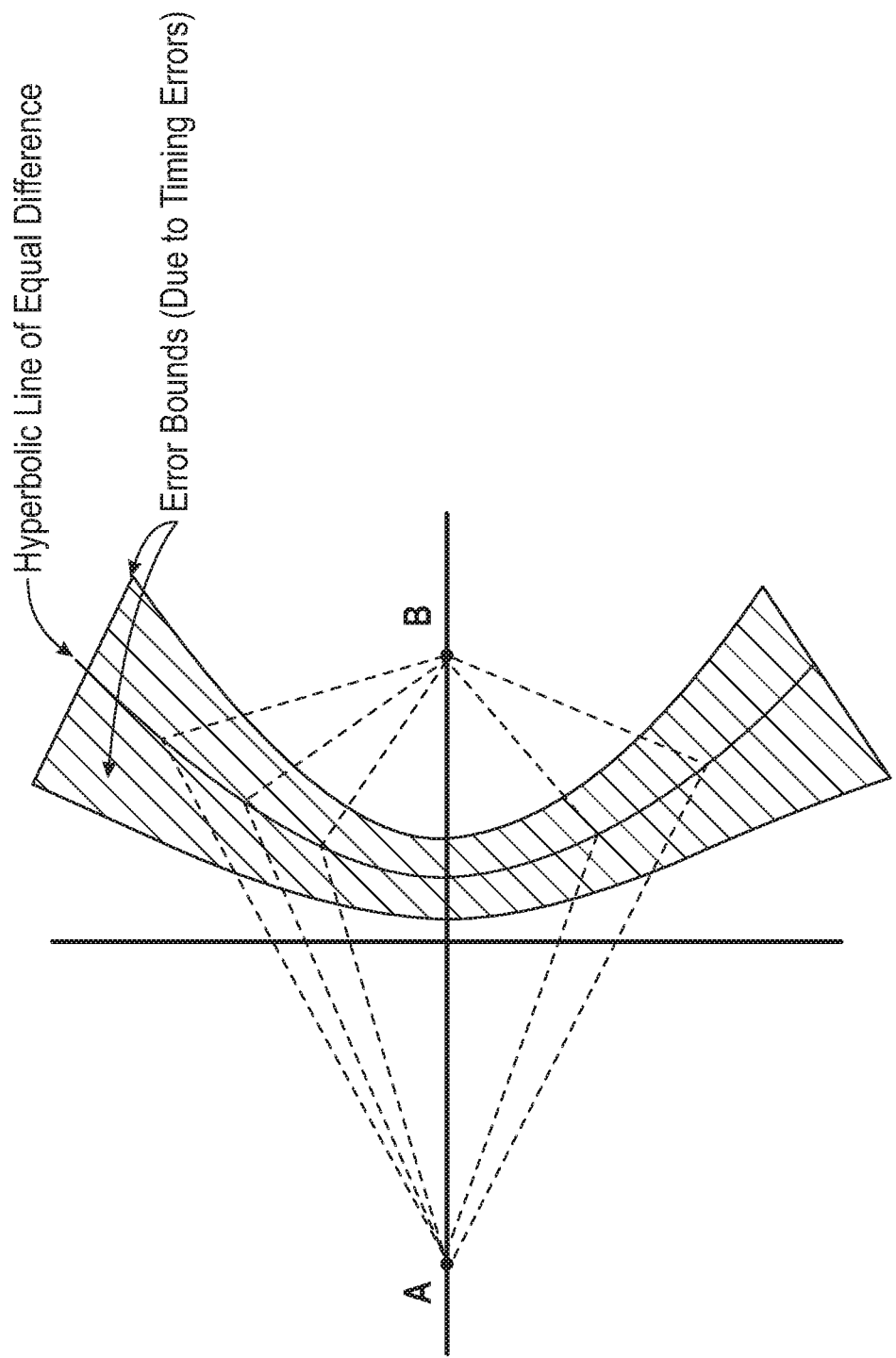
FIG. 11 illustrates two RF transceivers A and B and a theoretical hyperbolic line of equal distance that the receiver should be on according to some embodiments of the present disclosure.

As discussed above, timing based locationing solutions calculate time vectors as differences measuring the fastest arrival and estimating how late other signals arrive: TDoA. Network measurements use "Uplink TDoA" and client device measurements use "Downlink TDoA" and both result in hyperbolic intersection curves which trilateration algorithms are required to solve. FIG. 11 illustrates two RF transceivers A and B. There is a theoretical hyperbolic line of equal distance that the receiver should be on. However, since there are potential errors in both measurements, a statistical error bounds is created instead, e.g., due to timing errors. In this case, the receiver should statistically be within the hashed area.

Figure 12:
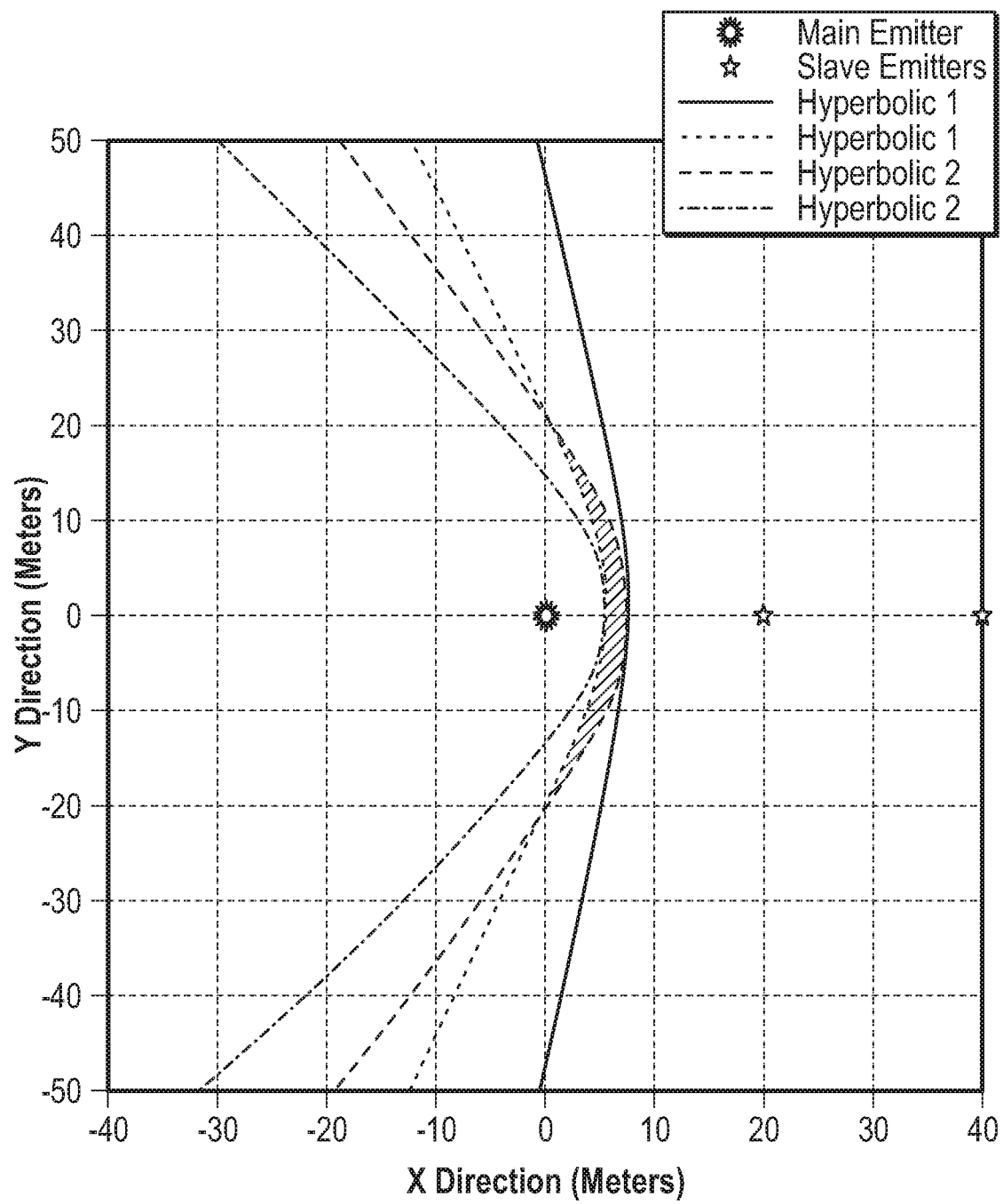
FIG. 12 illustrates an example where the RF transceivers are in a line according to some embodiments of the present disclosure.

The geometry of trilateration requires the RF transceivers which are included in the calculations to be distributed in the X-Y plane, and not all located along an axis, for example, in a line down a hallway. For example, in FIG. 12, the RF transceivers are in a line, the estimated position is found in the overlap area of hyperbolic 1 and hyperbolic 2, shown as the hatched area. The length of overlap area is about 40 meters. This means the positioning error is about 40 m, which is excessively large and would not meet, for example, SLA requirements of 100% of locationing accuracies less than 10 m.

Figure 13:
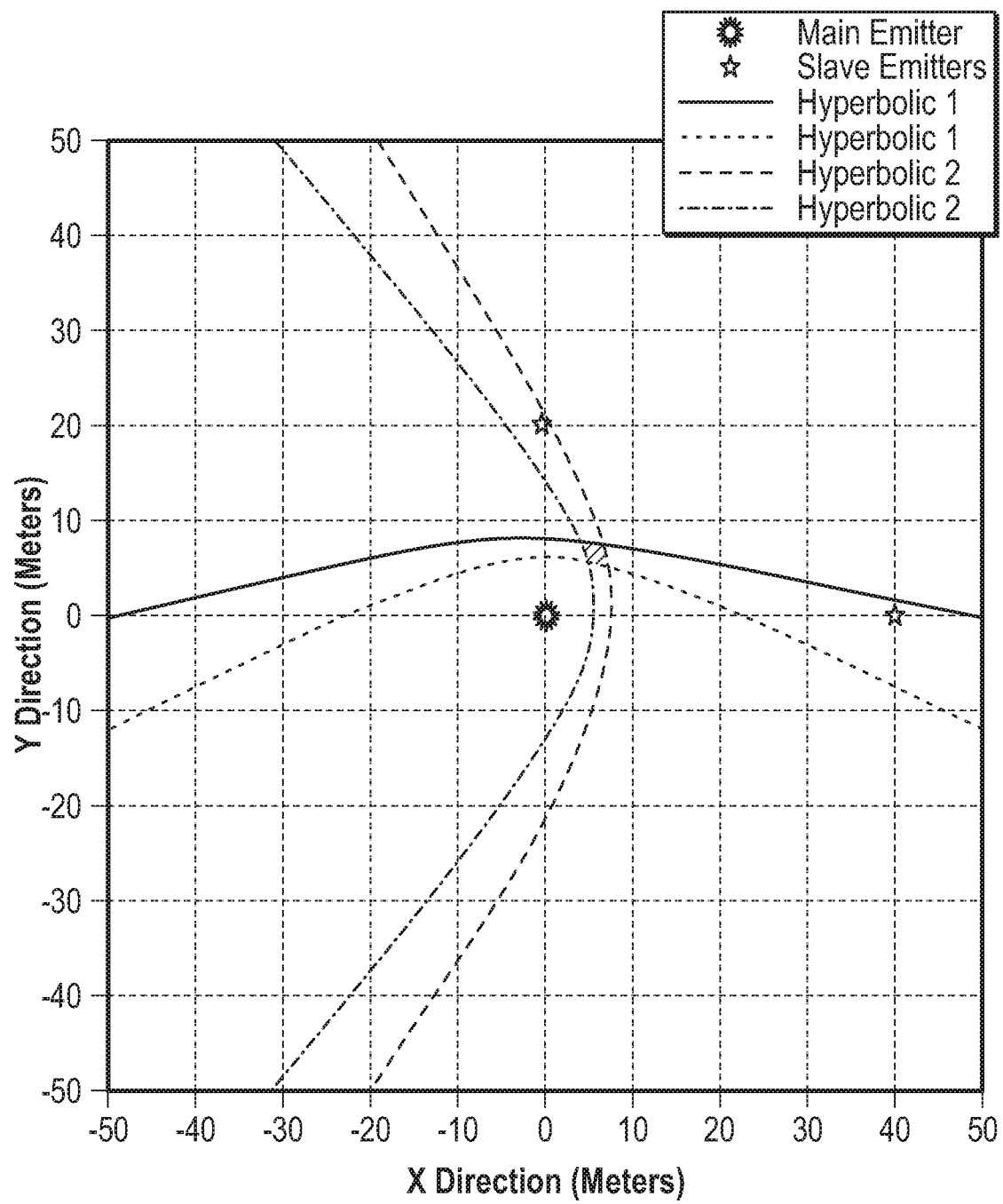
FIG. 13 illustrates an example where the RF transceivers are not in a line according to some embodiments of the present disclosure.

In FIG. 13, the RF transceivers are not in a line, the overlap area is very small, and the length of overlap area is about 3 m, which indicates the positioning error is about 3 meters.

The RF Planning software calculates the error estimate for each location in the venue and presents the user with an indication of the locationing accuracy error due to geometry. This indication may be visual, in the form of a heatmap, or may be a summary indication for any specific positions in the venue. The RF Planning software may also visually indicate the closest Access Points (APs) which are used in the trilateration calculations to better empower the network designer to improve the placement of radios. As discussed above, these results could also be used for automated placements of transceivers. For instance, if there are multiple suitable locations for the transceivers, the system can create a measurement of locationing accuracy for all of the various combinations to determine the best placement of the transceivers.

Additional discussion of how geometry affects locationing accuracy is provided below. The following figures present contours of positioning error based on some scenarios. In the following examples, emitters (RF transceivers) are shown as stars, the X-axis represents the East-West direction in meters, and the Y-axis represents the North-South direction in meters.

Figure 14:
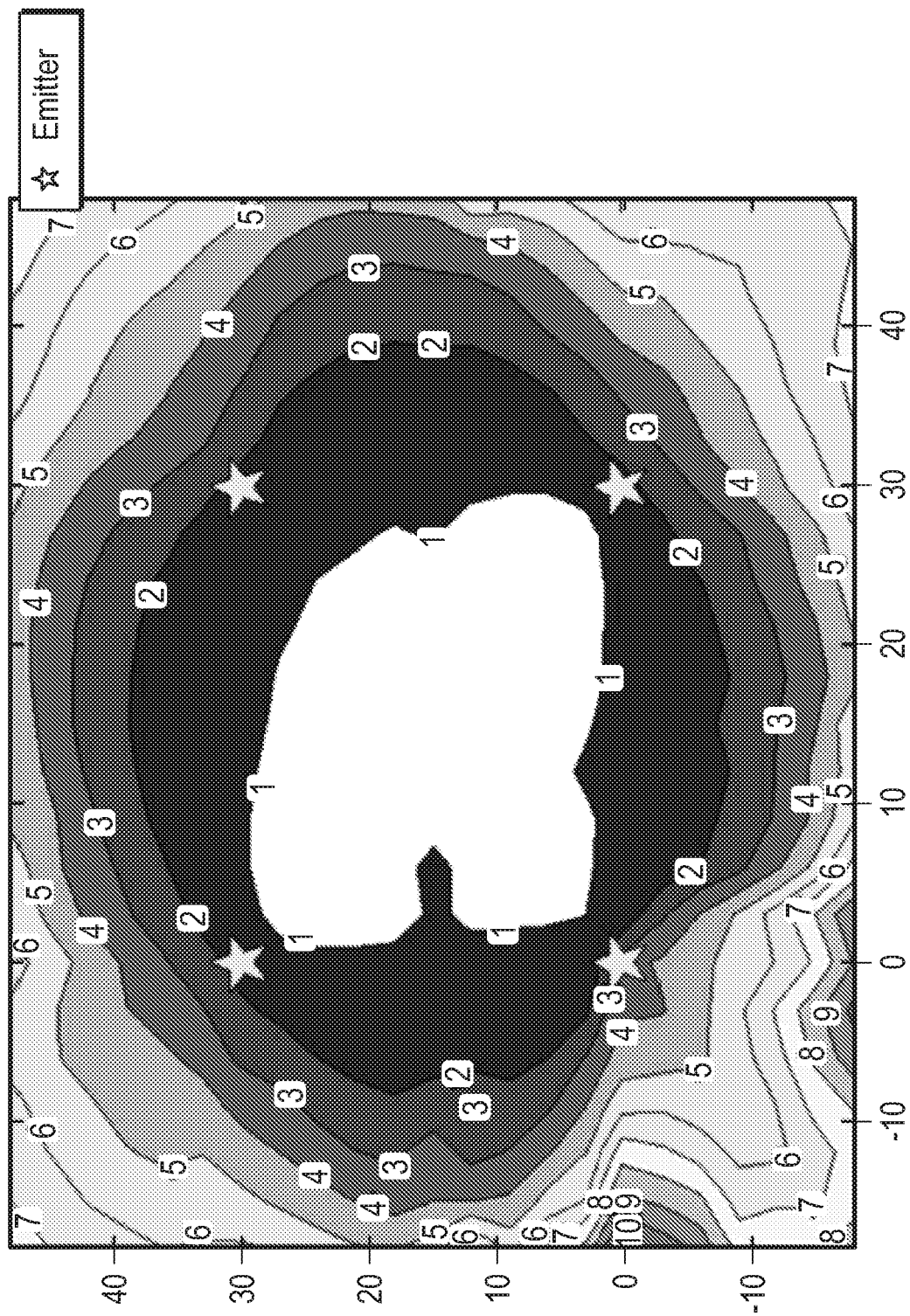
FIGS. 14 and 15 illustrate a large hall room with the emitters evenly distributed according to some embodiments of the present disclosure.
Figure 15:
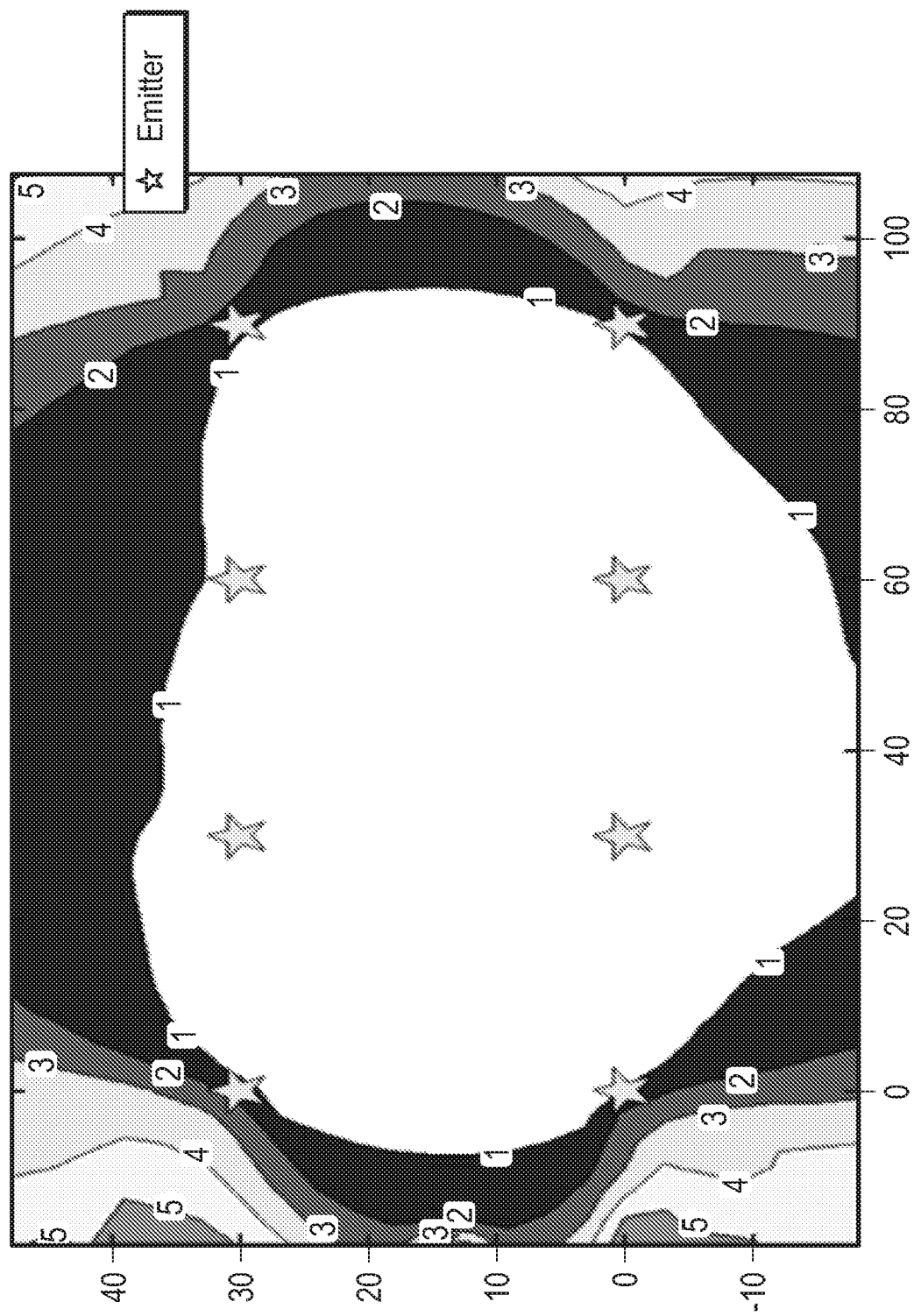
Figure 16:
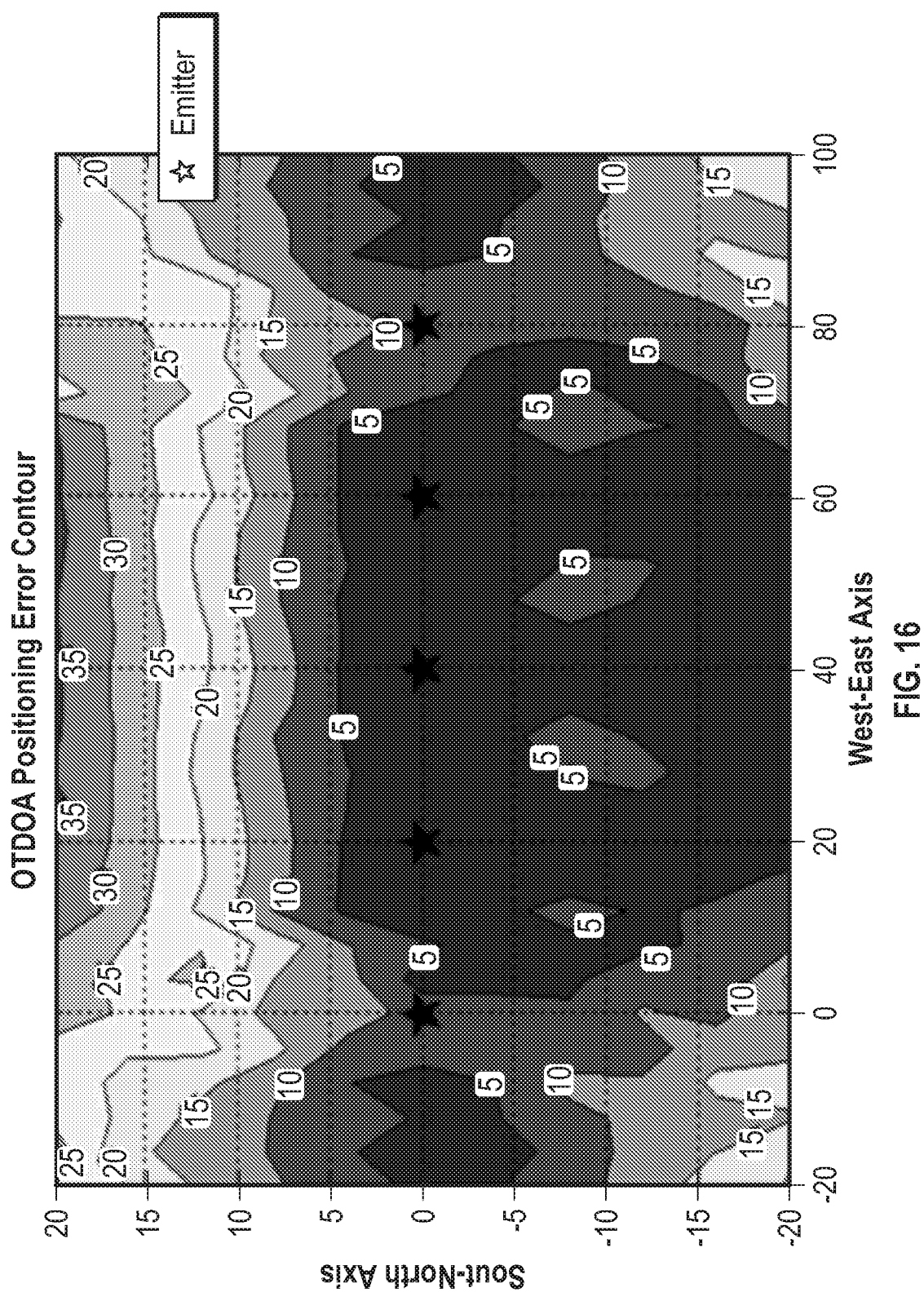
FIGS. 16 through 19 illustrate a hallway example that highlights the issue of placing RF transceivers in a line according to some embodiments of the present disclosure.

FIGS. 14 and 15 illustrate a large hall room with the emitters evenly distributed. FIG. 14 shows the case where there are four emitters while FIG. 15 shows the case where there are eight emitters. These two examples show geometry impacting locationing accuracy. Within the area enclosed by the emitters, the positioning error is very small. In corners, the positioning error is large.

The geometric effect where the positioning error is small (FIG. 13) and large (FIG. 12) is referred to as Dilution of Precision (DoP) known to those skilled in the art. While the relative precision of a positioning measurement may be ±1 m, as in FIG. 13, the geometry of the emitters in FIG. 12 may cause a significant DoP increase yielding ±20 m in the Y-direction as shown. The embodiments disclosed herein may allow a Network Positioning RF Planner to indicate to a system installer which regions may have high DoP and recommend to the system installer or planner where to locate radio transceivers to minimize the DoP.

FIGS. 16 through 19 illustrate a hallway example that highlights the issue of placing RF transceivers in a line. When emitters are in a line as in FIG. 16, the mean error of 12 m is very large in the desired coverage area. In this example, the RF transmitters are arranged along the west-east axis, and do not vary along the south-north axis.

Figure 17:
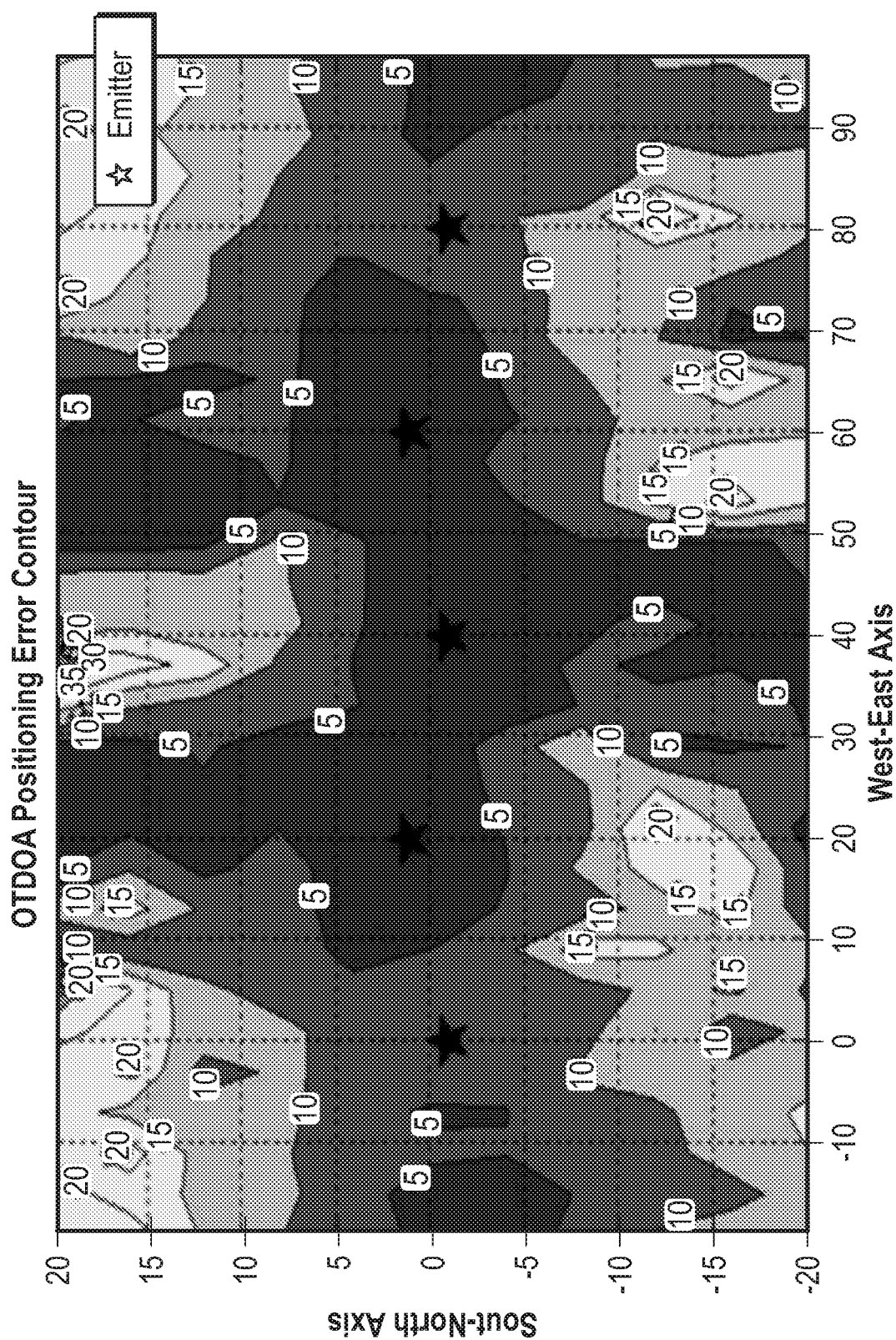
Figure 18:
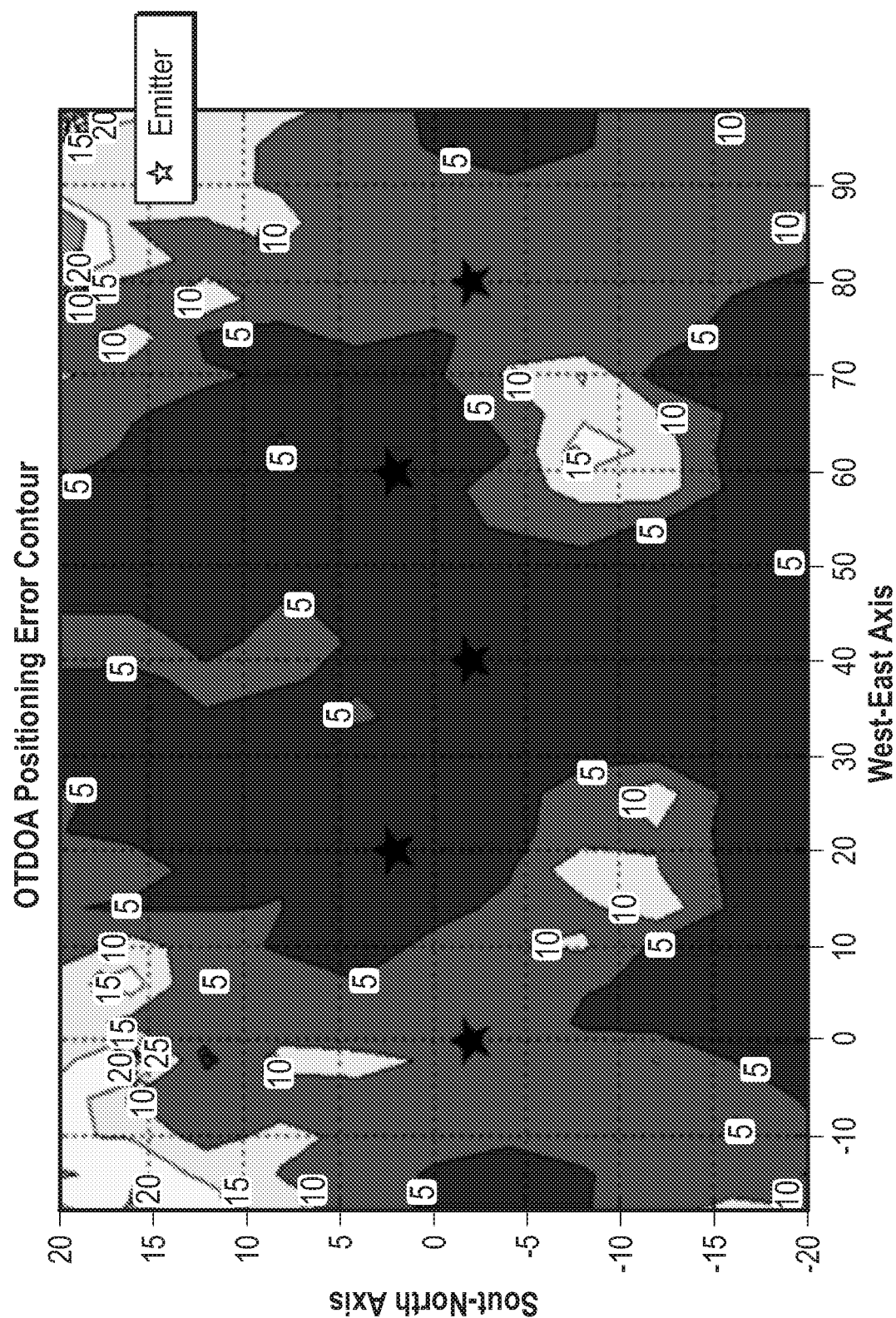
Figure 19:
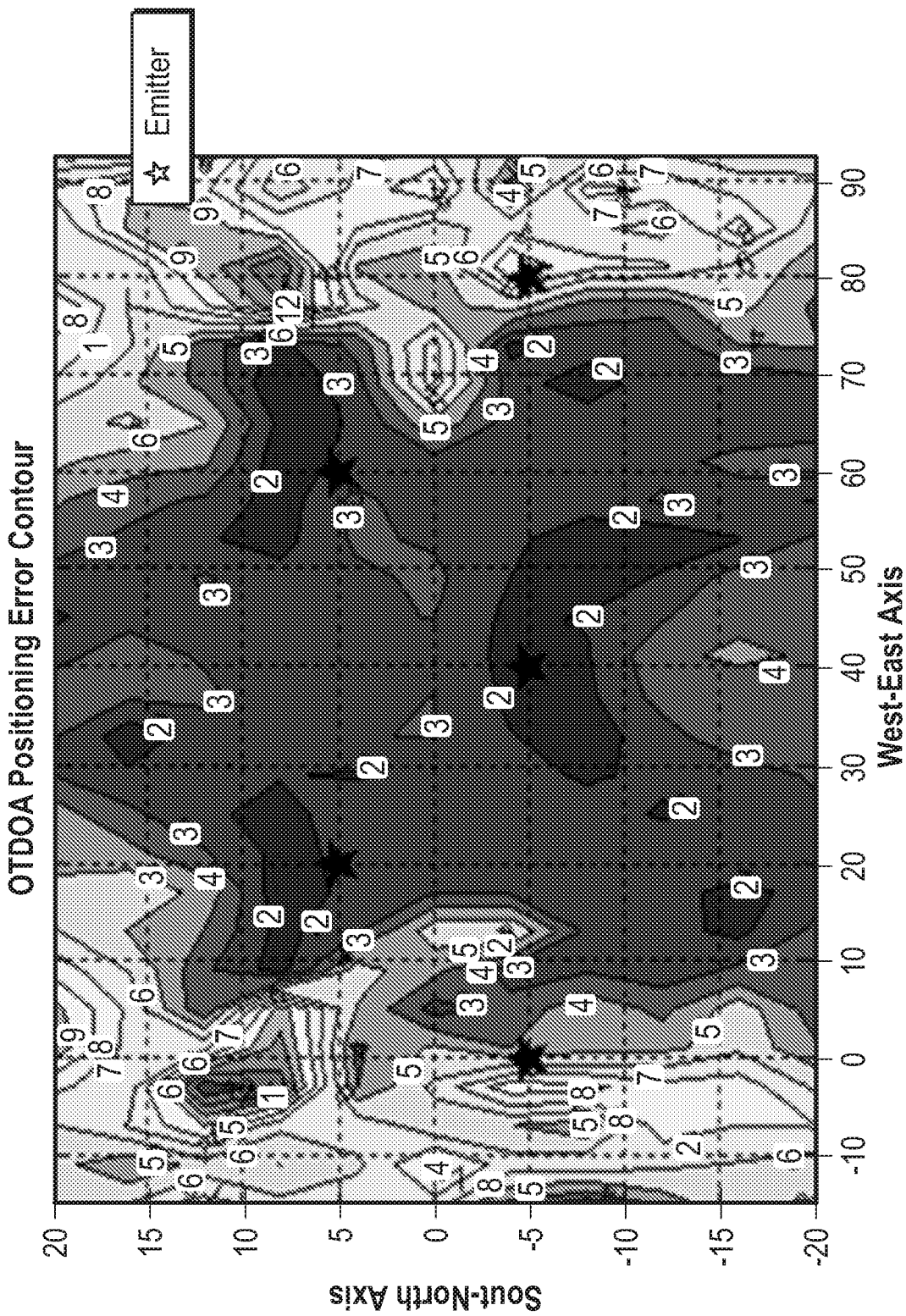

However, when the same RF transmitters/emitters are staggered ±1 meters in the south-north direction as in FIG. 17, the mean error is much improved from the previous case to 9 m. When emitters are staggered ±2 meters in the south-north direction shown in FIG. 18, the mean error is much better at 6.6 meters. When emitters are staggered ±5 meters in the south-north direction as in FIG. 19, the mean error is better than the last figure, which is about 4.3 meters.

This hallway example shows that when the RF transceivers/emitters are arranged linearly, the positioning error is very large. As RF transceivers/emitters are distributed in both west-east and south-north directions, the positioning errors due to geometry are greatly reduced.

Figure 20:
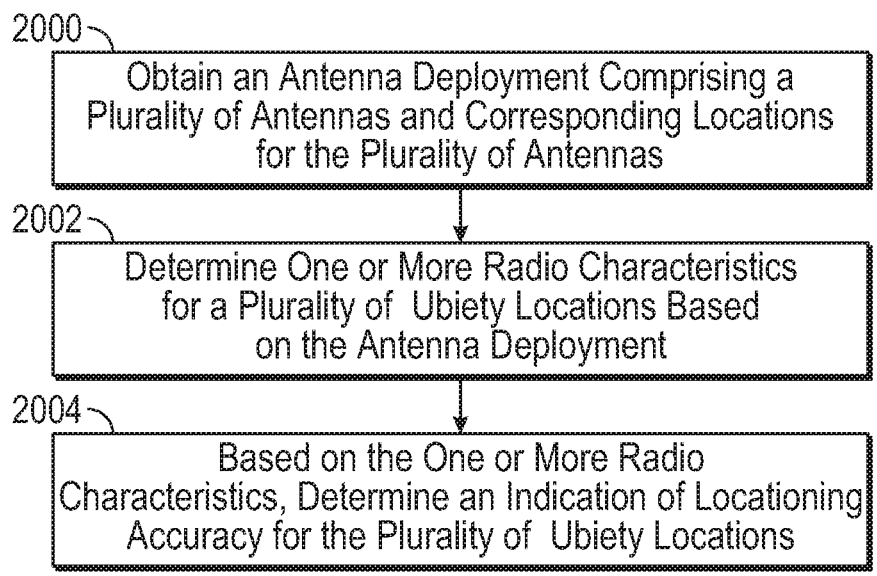
FIG. 20 illustrates a method of determining an indication of locationing accuracy.

FIG. 20 illustrates a method of determining an indication of locationing accuracy. First, an antenna deployment comprising a plurality of antennas and corresponding locations for the plurality of antennas is obtained (step 2000). Then, one or more radio characteristics are determined for a plurality of ubiety locations based on the antenna deployment (step 2002). An indication of locationing accuracy for the plurality of ubiety locations is then determined based on the one or more radio characteristics (step 2004).

Figure 21:
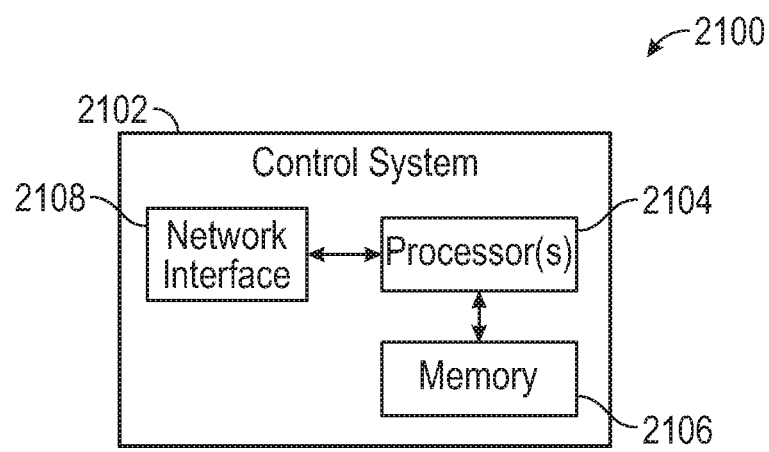
FIG. 21 is a schematic block diagram of a computation node according to some embodiments of the present disclosure.

FIG. 21 is a schematic block diagram of a computation node 2100 according to some embodiments of the present disclosure. As illustrated, the computation node 2100 includes a control system 2102 that includes one or more processors 2104 (e.g., Central Processing Units (CPUs), Application Specific Integrated Circuits (ASICs), Field Programmable Gate Arrays (FPGAs), and/or the like), memory 2106, and a network interface 2108. The one or more processors 2104 are also referred to herein as processing circuitry. The one or more processors 2104 operate to provide one or more functions of a computation node 2100 as described herein. In some embodiments, the function(s) are implemented in software that is stored, e.g., in the memory 2106 and executed by the one or more processors 2104.

Figure 22:
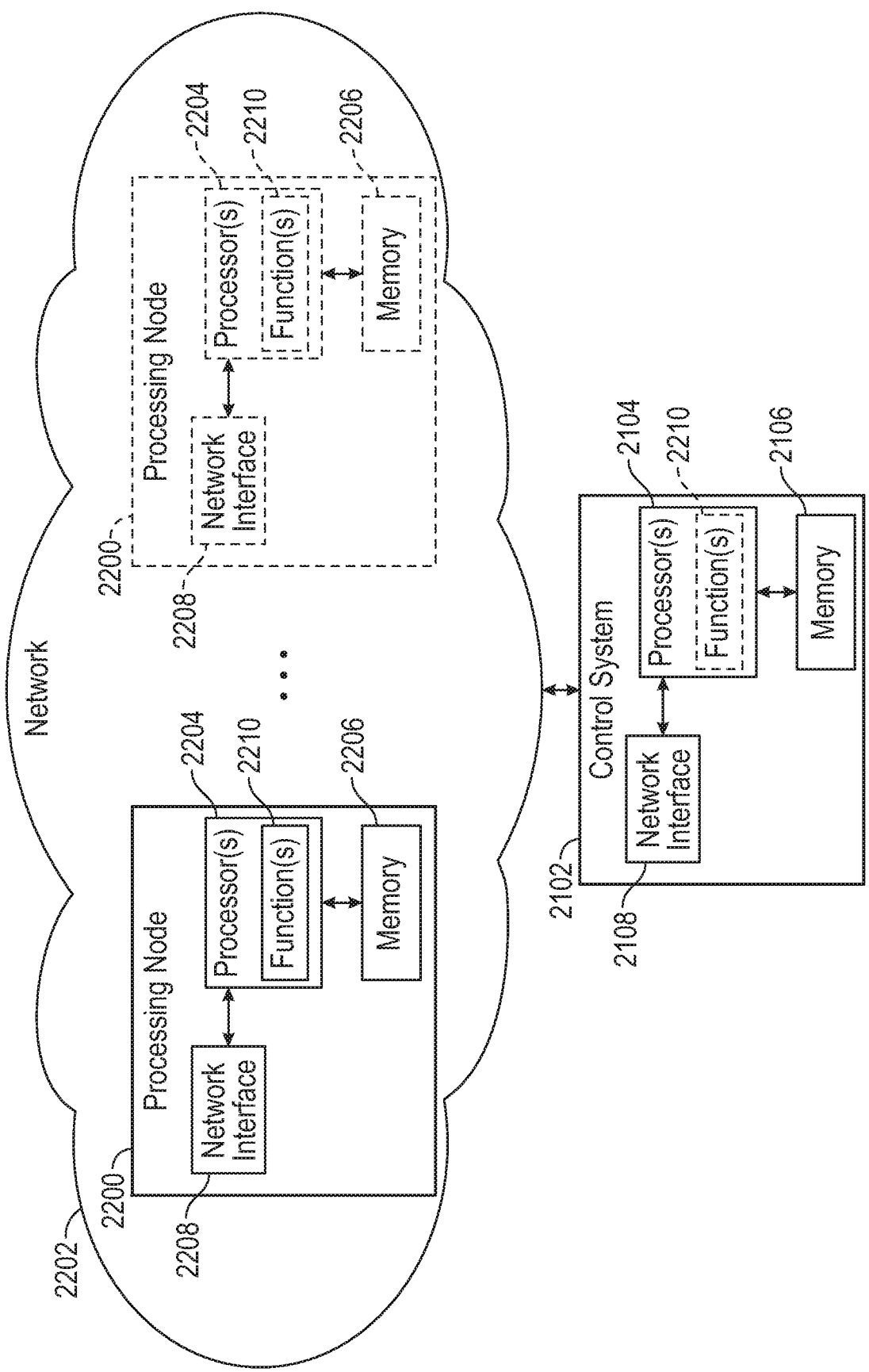
FIG. 22 is a schematic block diagram that illustrates a virtualized embodiment of the computation node of FIG. 21 according to some embodiments of the present disclosure.

FIG. 22 is a schematic block diagram that illustrates a virtualized embodiment of the computation node 2100 according to some embodiments of the present disclosure. This discussion is equally applicable to other types of network nodes. Further, other types of network nodes may have similar virtualized architectures.

As used herein, a "virtualized" computation node is an implementation of the computation node 2100 in which at least a portion of the functionality of the computation node 2100 is implemented as a virtual component(s) (e.g., via a virtual machine(s) executing on a physical processing node (s) in a network(s)). As illustrated, in this example, the computation node 2100 includes the control system 2102 that includes the one or more processors 2104 (e.g., CPUs, ASICs, FPGAs, and/or the like), the memory 2106, and the network interface 2108. The control system 2102 is connected to one or more processing nodes 2200 coupled to or included as part of a network(s) 2202 via the network interface 2208. Each processing node 2200 includes one or more processors 2204 (e.g., CPUs, ASICs, FPGAs, and/or the like), memory 2206, and a network interface 2208.

In this example, functions 2210 of the computation node 2100 described herein are implemented at the one or more processing nodes 2200 or distributed across the control system 2102 and the one or more processing nodes 2200 in any desired manner. In some particular embodiments, some or all of the functions 2210 of the computation node 2100 described herein are implemented as virtual components executed by one or more virtual machines implemented in a virtual environment(s) hosted by the processing node(s) 2200. As will be appreciated by one of ordinary skill in the art, additional signaling or communication between the processing node(s) 2200 and the control system 2102 is used in order to carry out at least some of the desired functions 2210.

In some embodiments, a computer program including instructions which, when executed by at least one processor, causes the at least one processor to carry out the functionality of computation node 2100 or a node (e.g., a processing node 2200) implementing one or more of the functions 2210 of the computation node 2100 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 23:
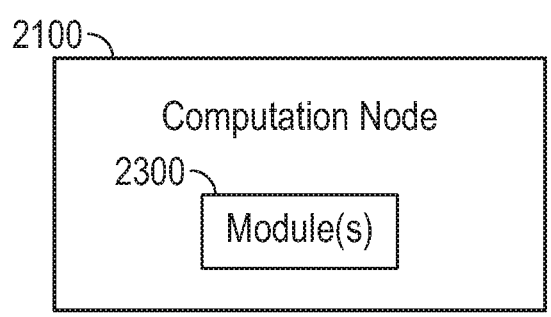
FIG. 23 is a schematic block diagram of the computation node of FIG. 21 according to some other embodiments of the present disclosure.

FIG. 23 is a schematic block diagram of the computation node 2100 according to some other embodiments of the present disclosure. The computation node 2100 includes one or more modules 2300, each of which is implemented in software. The module(s) 2300 provide the functionality of the computation node 2100 described herein. This discussion is equally applicable to the processing node 2200 of FIG. 22 where the modules 2300 may be implemented at one of the processing nodes 2200 or distributed across multiple processing nodes 2200 and/or distributed across the processing node(s) 2200 and the control system 2102.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processors (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

At least some of the following abbreviations may be used in this disclosure. If there is an inconsistency between abbreviations, preference should be given to how it is used above. If listed multiple times below, the first listing should be preferred over any subsequent listing(s).

3GPP Third Generation Partnership Project
5G Fifth Generation
AoA Angle of Arrival
AoD Angle of Departure
AP Access Point
ASIC Application Specific Integrated Circuit
CPU Central Processing Unit
dB Decibel
dBm Decibel-Milliwatt
DoP Dilution of Precision
DSP Digital Signal Processor
Ec/No Received Chip Energy over Noise
FPGA Field Programmable Gate Array
GPS Global Positioning System
GSM Global System for Mobile Communications
IoT Internet of Things
ITU International Telecommunication Union
KPI Key Performance Indicator
LBS Location Based Service
LOP Locus of all possible Positions
LoS Line of Sight
LTE Long Term Evolution
M2M Machine-to-Machine
MIMO Multiple Input Multiple Output
NLoS Non-Line of Sight
NR New Radio
NVP Nominal Velocity of Propagation
PD Propagation Delay RAM Random Access Memory
RF Radio Frequency
RMS Root Mean Square
RMSE Root Mean Square Error
ROM Read Only Memory
RSCP Received Signal Code Power
RSRP Reference Signal Received Power
RSRQ Reference Signal Received Quality
Rx Reception
SLA Service Level Agreement
SNR Signal-to-Noise Ratio
TDOA Time Difference of Arrival
ToA Time of Arrival
ToF Time of Flight
Tx Transmission
UE User Equipment
UMTS Universal Mobile Telecommunications System
USB Universal Serial Bus Those skilled in the art will recognize improvements and modifications to the embodiments of the present disclosure. All such improvements and modifications are considered within the scope of the concepts disclosed herein.

What is claimed is:

1. A method implemented in a computation node for determining an indication of locationing accuracy, comprising:
   obtaining an antenna deployment comprising a plurality of antennas and corresponding locations for the plurality of antennas;
   determining one or more radio characteristics for a plurality of relative locations within a venue, referred to as ubiety locations based on the antenna deployment, wherein one or more floorplans are used to calculate one or more of the one or more radio characteristics based thereon, wherein the one or more floorplans are used to determine one or more reflected propagation paths between the plurality of antennas and the plurality of ubiety locations;
   segmenting one or more of the one or more floorplans into a grid of x, y coordinates, wherein the one or more of the one or more radio characteristics, comprising path gain, are calculated for each of the x, y coordinates; and
   determining the indication of locationing accuracy for the plurality of ubiety locations based on the one or more radio characteristics.

2. The method of claim 1 wherein determining the one or more radio characteristics for the plurality of ubiety locations comprises determining a Signal-to-Noise Ratio, SNR, for the plurality of ubiety locations based on the antenna deployment.

3. The method of claim 1 wherein determining the indication of locationing accuracy for the plurality of ubiety locations comprises determining a timing error for the plurality of ubiety locations based on the one or more radio characteristics for the plurality of ubiety locations.

4. The method of claim 3 wherein determining the timing error for the plurality of ubiety locations comprises determining a Root Mean Square, RMS, timing error for the plurality of ubiety locations based on the one or more radio characteristics for the plurality of ubiety locations.

5. The method of claim 3 wherein determining the timing error for the plurality of ubiety locations comprises determining a mean timing error for the plurality of ubiety locations based on the one or more radio characteristics for the plurality of ubiety locations.

6. The method of claim 1 wherein determining the indication of locationing accuracy for the plurality of ubiety locations comprises determining the indication of locationing accuracy for the plurality of ubiety locations based on the one or more radio characteristics using tables that relate the one or more radio characteristics to the indication of locationing accuracy.

7. The method of claim 1 wherein determining the indication of locationing accuracy for the plurality of ubiety locations comprises determining the indication of locationing accuracy for the plurality of ubiety locations based on the one or more radio characteristics using mathematical models that relate the one or more radio characteristics to the indication of locationing accuracy.

8. The method of claim 7 wherein determining the indication of locationing accuracy for the plurality of ubiety locations based on the one or more radio characteristics using mathematical models comprises determining the indication of locationing accuracy for the plurality of ubiety locations based on the one or more radio characteristics using the mathematical models that relate the one or more radio characteristics to the indication of locationing accuracy that accounts for multipath propagation from the plurality of antennas to the plurality of ubiety locations.

9. The method of claim 7 wherein determining the indication of locationing accuracy for the plurality of ubiety locations based on the one or more radio characteristics using the mathematical models comprises determining the indication of locationing accuracy for the plurality of ubiety locations based on the one or more radio characteristics using the mathematical models that relate the one or more radio characteristics to the indication of locationing accuracy that accounts for how delay spread can affect Time of Flight, ToF, and/or Time Difference of Arrival, TDoA, estimate accuracy.

10. The method of claim 7 wherein determining the indication of locationing accuracy for the plurality of ubiety locations based on the one or more radio characteristics using the mathematical models comprises determining the indication of locationing accuracy for the plurality of ubiety locations based on the one or more radio characteristics using the mathematical models that relate the one or more radio characteristics to the indication of locationing accuracy by defining positioning accuracy as an intersection of multiple hyperbolic curves, each with varying degrees of accuracy.

11. The method of claim 1 further comprising generating a visual representation of the indication of locationing accuracy for the plurality of ubiety locations.

12. The method of claim 11 wherein generating the visual representation of the indication of locationing accuracy for the plurality of ubiety locations comprises generating a heatmap representing the indication of locationing accuracy for the plurality of ubiety locations.

13. The method of claim 11 wherein generating the visual representation of the indication of locationing accuracy for the plurality of ubiety locations comprises generating an isometric curve representing the indication of locationing accuracy for the plurality of ubiety locations.

14. The method of claim 11 wherein generating the visual representation of the indication of locationing accuracy for the plurality of ubiety locations comprises generating the visual representation indicating a number of the plurality of antennas visible at the plurality of ubiety locations.

15. A computation node comprising:
   circuitry comprising one or more processors and a memory containing instructions whereby the computation node is configured to:

obtain an antenna deployment comprising a plurality of antennas and corresponding locations for the plurality of antennas;

determine one or more radio characteristics for a plurality of relative locations within a venue, referred to as ubiety locations based on the antenna deployment, wherein one or more floorplans are used to calculate one or more of the one or more radio characteristics based thereon, wherein the one or more floorplans are used to determine one or more reflected propagation paths between the plurality of antennas and the plurality of ubiety locations;

segment one or more of the one or more floorplans into a grid of x, y coordinates, wherein the one or more of the one or more radio characteristics, comprising path gain, are calculated for each of the x, y coordinates; and determine an indication of locationing accuracy for the plurality of ubiety locations based on the one or more radio characteristics.

16. A non-transitory computer-readable medium comprising instructions which, when executed on at least one processor, cause the at least one processor to:

obtain an antenna deployment comprising a plurality of antennas and corresponding locations for the plurality of antennas;

determine one or more radio characteristics for a plurality of relative locations within a venue, referred to as ubiety locations based on the antenna deployment, wherein one or more floorplans are used to calculate one or more of the one or more radio characteristics based thereon, wherein the one or more floorplans are used to determine one or more reflected propagation paths between the plurality of antennas and the plurality of ubiety locations;

segment one or more of the one or more floorplans into a grid of x, y coordinates, wherein the one or more of the one or more radio characteristics, comprising path gain, are calculated for each of the x, y coordinates; and determine an indication of locationing accuracy for the plurality of ubiety locations based on the one or more radio characteristics.

17. The method of claim 1, wherein the one or more reflected propagation paths between the plurality of antennas and the plurality of ubiety locations comprise:

a first propagation path between a first antenna of the plurality of antennas and one of the ubiety locations; and a second propagation path between a second antenna of the plurality of antennas and the one of the ubiety locations, wherein the first antenna and the second antenna are different.

* * * * *